US012681654B2

(12) United States Patent
Vankamamidi et al.

(10) Patent No.: US 12,681,654 B2
(45) Date of Patent: Jul. 14, 2026

(54) FLEXIBLE DATA PLACEMENT USING LOG STRUCTURED SYSTEM

(71) Applicant: Dell Products L.P., Hopkinton, MA (US)

(72) Inventors: Vamsi K. Vankamamidi, Hopkinton, MA (US); Ajay Karri, South Grafton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/927,157

(22) Filed: Oct. 25, 2024

(65) Prior Publication Data

US 2026/0186679 A1     Jul. 2, 2026

(51) Int. Cl.
*G06F 3/06*          (2006.01)

(52) U.S. Cl.
CPC .......... *G06F 3/0635* (2013.01); *G06F 3/0608* (2013.01); *G06F 3/0631* (2013.01); *G06F 3/067* (2013.01)

(58) Field of Classification Search
CPC .... G06F 3/0635; G06F 3/0608; G06F 3/0631; G06F 3/067
USPC .......................................................... 711/154
See application file for complete search history.

(56) References Cited

U.S. PATENT DOCUMENTS

2021/0034289 A1* 2/2021 Dalmatov ............. G06F 3/0616
2024/0411477 A1* 12/2024 Li ......................... G06F 3/0655

2025/0036303 A1* 1/2025 Brandt ................. G06F 3/0679
2025/0068330 A1* 2/2025 Kamran ............... G06F 3/0608
2025/0231710 A1* 7/2025 Alkalay ............... G06F 3/0652

OTHER PUBLICATIONS https://nvmexpress.org/wp-content/uploads/FMS-2023-Flexible-Data-Placement-FDP-Overview.pdf, "Flexible Data Placement: State of the Union", Aug. 2023, Sabol et al.
Michael Allison, et al., "What is the NVM Express® Flexible Data Placement (FDP)?", Michael Allison, Samsung, Sep. 20, 2023.
U.S. Appl. No. 18/626,835, filed Apr. 4, 2024, "Data Storage Management Techniques", Vamsi K. Vankamamidi, et al.
Arun George, et al., Getting Started with Flexible Data Placement (FDP) Global Open-ecoSystem Team (GOST), https://download.semiconductor.samsung.com/resources/white-paper/getting-started-with-fdp-v4.pdf, 2024.

* cited by examiner

*Primary Examiner* — Than Nguyen
(74) *Attorney, Agent, or Firm* — BainwoodHuang

(57) ABSTRACT

Techniques can include: receiving writes from applications executing on hosts; recording, the writes in entries in a log; and flushing, from the log, the entries denoting the write operations, including: segregating content written by the write operations into streams, wherein each of the streams corresponds to one of a plurality of classes or types of data associated with one of a plurality of I/O profiles characterizing said each stream and said one class or type of data; and for each of the streams corresponding to one class or type of data associated with one I/O profile, persistently storing a corresponding portion of the content in one of a plurality of sub log structured systems (LSSs) used for only storing data of the one class or type that corresponds to said each stream.

20 Claims, 19 Drawing Sheets

| F values | U values | (NS) # Source PLBs needed to generate 1 free PLB | (NT) # target PLBs written to |
|---|---|---|---|
| 50% (e.g., .50 or 1/2) | 50% (e.g., .50 or 1/2) | 2 | 1 |
| 33% (e.g., .33 or 1/3) | 67% (e.g., .67 or 2/3) | 3 | 2 |
| 25% (e.g., .25 or 1/4) | 75% (e.g., .75 or 3/4) | 4 | 3 |
| 10% (e.g., .10 or 1/10) | 90% (e.g., .90 or 9/10) | 10 | 9 |

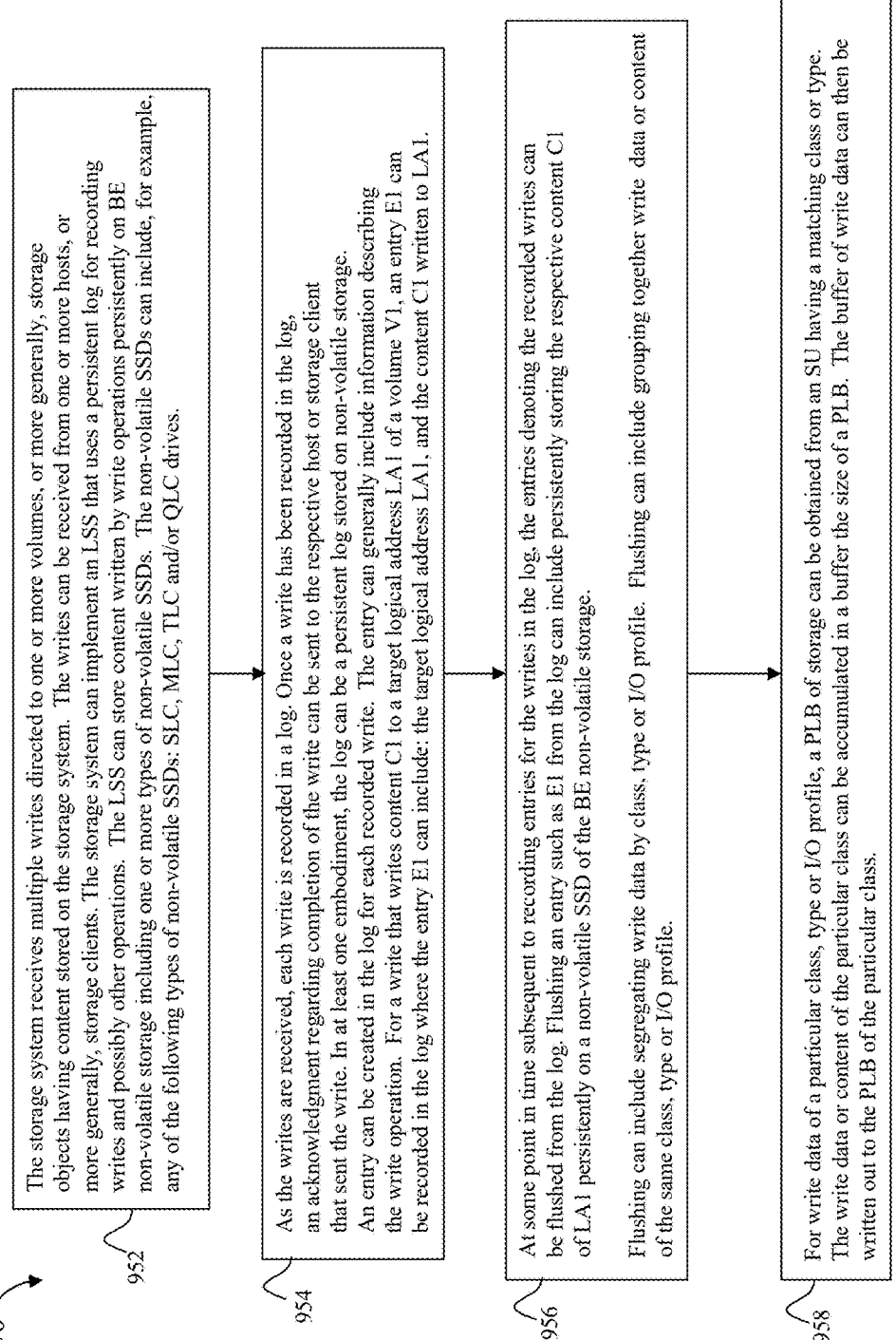

The storage system receives multiple writes directed to one or more volumes, or more generally, storage objects having content stored on the storage system. The writes can be received from one or more hosts, or more generally, storage clients. The storage system can implement an LSS that uses a persistent log for recording writes and possibly other operations. The LSS can store content written by write operations persistently on BE non-volatile storage including one or more types of non-volatile SSDs. The non-volatile SSDs can include, for example, any of the following types of non-volatile SSDs: SLC, MLC, TLC and/or QLC drives.

952

As the writes are received, each write is recorded in a log. Once a write has been recorded in the log, an acknowledgment regarding completion of the write can be sent to the respective host or storage client that sent the write. In at least one embodiment, the log can be a persistent log stored on non-volatile storage. An entry can be created in the log for each recorded write. The entry can generally include information describing the write operation. For a write that writes content C1 to a target logical address LA1 of a volume V1, an entry E1 can be recorded in the log where the entry E1 can include: the target logical address LA1, and the content C1 written to LA1.

954

At some point in time subsequent to recording entries for the writes in the log, the entries denoting the recorded writes can be flushed from the log. Flushing an entry such as E1 from the log can include persistently storing the respective content C1 of LA1 persistently on a non-volatile SSD of the BE non-volatile storage.

Flushing can include segregating write data by class, type or I/O profile. Flushing can include grouping together write data or content of the same class, type or I/O profile.

956

For write data of a particular class, type or I/O profile, a PLB of storage can be obtained from an SU having a matching class or type. The write data or content of the particular class can be accumulated in a buffer the size of a PLB. The buffer of write data can then be written out to the PLB of the particular class.

Type/Class A=20 TBs, 50% utilization

Type/Class B = 50 TBs, 30% utilization

Type/Class C=20 TBs, 100% utilization

1054

Type/Class A=20 TBs, 50% utilization

Type/Class B = 30 TBs, 50% utilization

Type/Class C=40 TBs, 50% utilization

1400

| | Class 1402 | | |
| | 1402a | 1402b | 1402c |
| | A | B | C |
| Priority 1404 | 9 | 5 | 2 |
| Allocated storage (in TBs) 1406 | 35 | 35 | 30 |
| Utilization 1408 | 70 | 75 | 80 |
| Overprovisioning factor 1410 | 15% | 0 | 0 |
| Target allocated storage (in TBs) 1412 | 40.25 | NA | NA |

FIG. 18

FLEXIBLE DATA PLACEMENT USING LOG STRUCTURED SYSTEM

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a storage system, a plurality of write operations from a plurality of applications executing on one or more hosts; recording, at the storage system, the plurality of write operations in a plurality of entries in a log; and flushing, from the log, the plurality of entries denoting the plurality of write operations, wherein said flushing includes: segregating first content written by the plurality of write operations from the plurality of applications into a plurality of streams, wherein each of the plurality of streams corresponds to one of a plurality of classes or types of data associated with one of a plurality of I/O profiles characterizing said each stream and said one class or type of data; and for each of the plurality of streams corresponding to said one class or type of data associated with said one I/O profile, persistently storing a corresponding portion of the first content in one of a plurality of sub log structured systems (LSSs) used for only storing data of said one class or type that corresponds to said each stream.

In at least one embodiment, the plurality of sub LSSs can each include back-end (BE) non-volatile storage of the storage system. For each of the sub LSSs, each time updated content written to a logical address is stored in said each sub LSS whereby the updated content replaces existing content stored at the logical address, the updated content can be written to a new physical location that is different from a current physical location of the existing content. Each of the plurality of I/O profiles, which corresponds to a first of the plurality of classes or types of data and a first of the plurality of streams, can include one or more characteristics of said first class or type of data, wherein the one or more characteristics can include any of: one or more I/O workload characteristics of the first class or type of data; a data deduplication ratio for the first class or type of data; a data compression ratio for the first class or type of data, and a tag identifying one or more of the plurality of applications that write data of the first class or type of data. The one or more I/O workload characteristics can include any of: an indication or whether a first I/O workload of the first class or type of data is write heavy whereby the first I/O workload has more write operations than read operations, an indication of whether writes of the first I/O workload exhibit spatial locality, and an indication of whether writes of the first I/O workload exhibit temporal locality. The plurality of applications can write to a plurality of storage entities each associated with one of the plurality of I/O profiles. The plurality of storage entities can include any of: one or more volumes, and one or more file systems.

In at least one embodiment, the plurality of sub LSSs can correspond to classes or types of storage, wherein each of the classes or types of storage can correspond to one of the plurality of classes or types of data. Processing can include determining that a first of the classes or types of storage needs first additional storage capacity in connection with storing data of a first of the plurality of classes or types of data; and in response to determining that the first class or type of storage needs the first additional storage capacity, performing first processing to increase a first allocated storage capacity of the first class or type of storage. The first class or type of storage can be a target class, and wherein the first processing can include redistributing or reallocating first free storage capacity from a second of the classes or types of storage to the target class, wherein the second class or type of storage can be a source class. The first processing can include performing first garbage collection (GC) processing on the source class to generate a first free storage segment reallocated from the source class to the target class. The first processing can include updating first information about the first free storage segment to indicate that the first free storage segment is included in the target class rather than the source class whereby the first free storage segment is used in connection with storing data of only a single class or type corresponding to the target class.

In at least one embodiment, the source class can correspond to a first sub LSS of the plurality of sub LSSs whereby the first GC processing can be performed on storage of the first sub LSS to generate the first free storage segment of the first sub LSS, and wherein the first GC processing can include: allocating a new storage segment associated with a new reclaim unit which is mapped to a first portion of BE non-volatile storage of the first sub LSS; combining valid data from two storage segments of the first sub LSS to generate combined first data, wherein the two storage segments correspond to two reclaim units mapped to two portions of BE non-volatile storage of the first sub LSS; storing the combined first data on the new claim unit; deallocating a first segment of the two storage segments, wherein said deallocating includes unmapping the first segment corresponding to a first of the two reclaim units from a corresponding one of the two portions of BE non-volatile storage of the first sub LSS; reallocating the first segment, wherein said reallocating includes mapping the first segment corresponding to the first reclaim unit to another corresponding portion of BE non-volatile storage of the first sub LSS; and assigning the first segment to the target class corresponding to a second sub LSS of the plurality of sub LSSs, wherein the first segment is the first free storage segment.

In at least one embodiment, the source class can correspond to a first sub LSS of the plurality of sub LSSs whereby the first GC processing can be performed on storage of the first sub LSS to generate the first free storage segment of the first sub LSS, and wherein the first GC processing can include: combining valid data from two storage segments of the first sub LSS to generate combined first data, wherein the two storage segments are included in BE non-volatile storage of the first sub LSS; storing the combined first data in a first of the two storage segments; and reassigning a second of the two storage segments to the target class corresponding to a second sub LSS of the plurality of sub LSSs. The two storage segments can be physical large blocks (PLBs) included in a first sub uber (SU) of BE non-volatile storage of the first sub LSS, wherein the first SU can be the first free storage segment reallocated from the source class to the target class. Processing can include assigning the first SU to the target class corresponding to a second sub LSS of the plurality of sub LSSs, wherein the first SU is included in the second sub LSS after said assigning the first SU to the target class.

In at least one embodiment, the first class or type of storage can correspond to a first of the plurality of sub LSSs, wherein the first class or type of storage can denote a target class, wherein a second of the classes or types of storage can corresponds to a second of the plurality of sub LSSs, wherein the second class can denote a source class, and wherein processing can include: determining, based at least in part, on a first write amplification denoting write amplification of the plurality of sub LSSs, to allocate the first additional storage capacity to the target class; and selecting the source class from the classes or types of storage based, at least in part, on a first priority of the target class and a second priority of the source class. Processing can include: determining the first priority of the target class based, at least in part, on a first write density of the target class and a first write amplification of the target class; and determining the second priority of the source class based, at least in part, on a second write density of the source class and a second write amplification of the source class, wherein the first priority of the target class indicates any one or more of: that the first write density of the target class is greater than the second write density of the source class, and that the first write amplification of the target class is greater than the second write amplification of the source class.

In at least one embodiment, processing can comprise performing GC processing including, for each of the plurality of sub LSSs, performing first GC processing on said each sub LSS using only storage of said each sub LSS, wherein said first GC processing includes generating a free segment or portion of storage of said each sub LSS.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 7 is a table of values that can be used to determine write amplification in an embodiment in accordance with the techniques of the present disclosure.

FIGS. 11, 17 and 19 are flowcharts of processing steps that can be performed in at least one embodiment in accordance with the techniques of the present disclosure.

FIGS. 12, 13, 14 and 18 are examples in connection with redistributing or reallocating storage among classes in at least one embodiment in accordance with the techniques of the present disclosure.

DETAILED DESCRIPTION OF EMBODIMENT(S)

Figure 1:
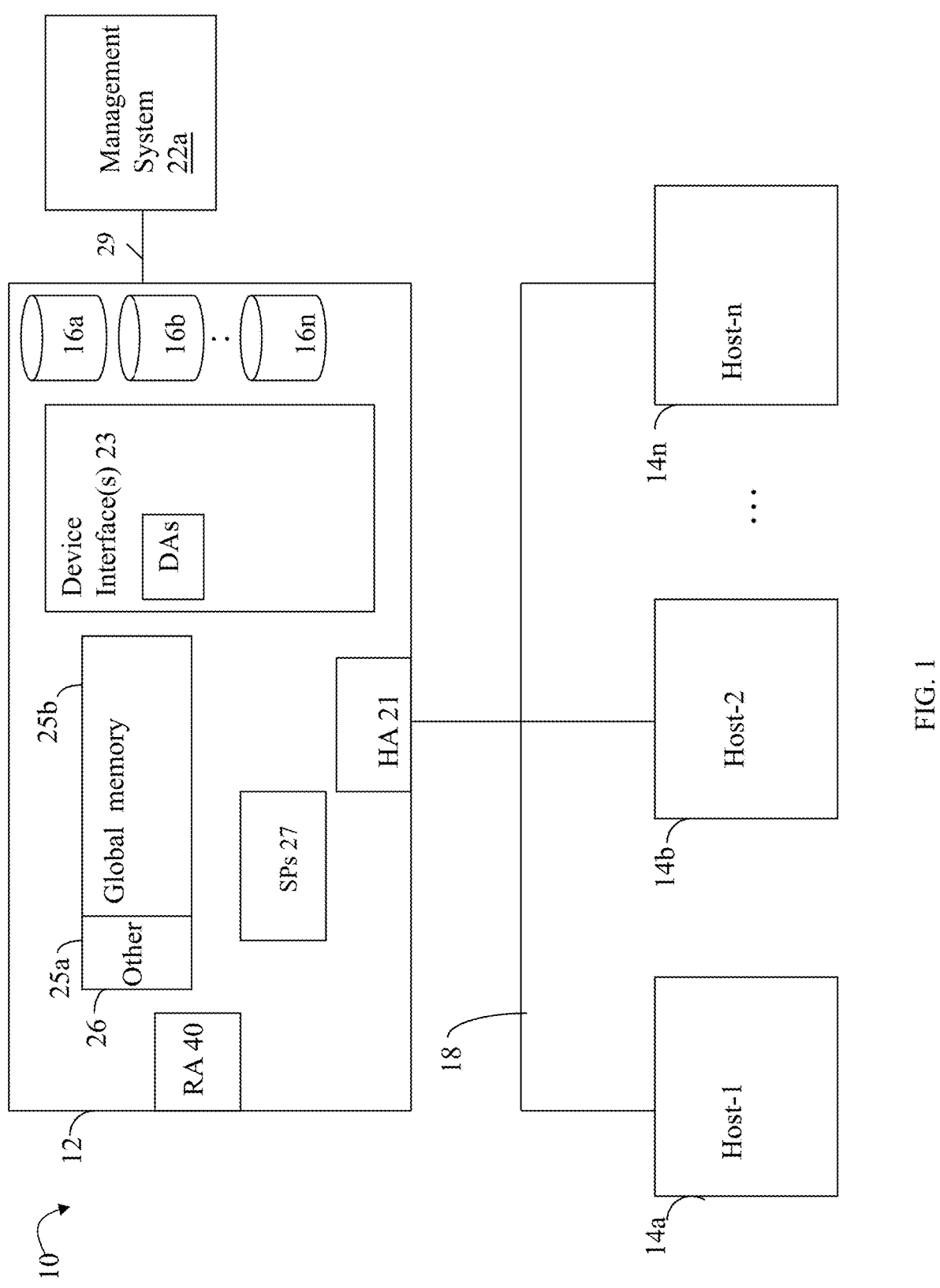
FIG. 1 is an example of components included in a system in accordance with the techniques of the present disclosure.

Generally, log structured stores or systems (LSSs) can be characterized by allowing new writes to be directed to free or unused storage on a data storage device, and by performing garbage collection (GC) that allows holes of storage including unused or invalid data to be compacted and reused. In an LSS, as newly written data provides updated values for existing data stored at a logical address, the newly written data can be stored at a new physical address or location on back-end (BE) non-volatile storage rather than overwriting or performing an "in place" update of a first storage location on BE non-volatile storage, where the first storage location contains the existing data of the logical address. After writing the new data to the logical address, where the new data is stored at the new physical address or location, the existing data stored at the first storage location can be old, stale or invalid. The LSS can perform GC processing to reclaim the first storage location containing the stale, invalid data. As a result of performing GC processing, the first storage location can be reclaimed, freed and made available for reuse.

Modern data storage systems can implement an LSS. The LSS as implemented by a data storage system can have its own components, for example, to maintain a log, perform logical to physical address translation using its own metadata, to perform GC processing, to perform storage management controlling data placement, to perform metadata management, and the like. Additionally, such modern data storage system can also utilize non-volatile BE storage which includes one or more non-volatile solid state storage devices or SSDs. In an LSS, newly written content to a logical address can be written to a new physical storage location on the BE SSDs. As noted above, the new content replaces the existing content of the logical address, where the existing content can be stored at another BE SSD storage location that is different from the new physical storage location of the newly written content of the logical address.

The LSS of the data storage system encounters write amplification (WA) which can generally be characterized as additional writes performed in order to write or store a single unit of valid data. The WA can occur generally due to the nature of operation of the LSS, such as noted above, due to 1) the LSS storing newly written content to a logical address at a new physical address or location each time there is an update or write to the logical address; and then 2) the GC processing performed to reclaim storage of stale invalid content, where the reclaimed storage can be made free and available for reuse. The GC processing performed by the storage system can include data movement or copying of valid content between BE storage chunks or portions in efforts to create or generate free BE storage chunks or portions for re-use. Although data stored at logical addresses can be written at a first point in time to sequentially contiguously located BE storage locations, as existing data of logical addresses is replaced with newly written content, existing data can become stale and invalid and can create holes of invalid data portions interspersed among valid data portions. As a result, GC processing can be performed to consolidate such valid data portions from multiple storage chunks also including invalid data portions to result in obtaining one or more free storage chunks. For example, GC processing can use two source chunks partially populated with valid content and a single target chunk that is completely free (e.g., storage of entire chunk is free and unused). GC processing can combine the valid content from the two source chunks and store the collective valid content of the two source chunks in the single target chunk, thereby generating one net free chunk. WA can include the additional writes performed by such GC processing to move or copy the valid content from the two source chunks to the single target chunk, where the additional writes can be performed in addition to previously writing the valid content to the source chunks such as a result of flushing a log of recorded write operations. The additional writes of WA can be characterized as an additional cost incurred in connection with storage management and policies of the LSS.

In this manner, the WA including the additional writes incurred as a result of GC can contribute to additional usage and wear of the BE storage devices or drives such as non-volatile SSDs. The non-volatile SSDs may only support a limited number of writes per day (WPD) in efforts to limit the wear on the SSDs in order for the SSDs to have at least a specified expected usable lifetime. Exceeding the WPD limit of an SSD can result in reducing the expected usable lifetime of the SSD. As a result to maintain or extend the expected usable lifetime of an SSD, there is motivation to generally reduce or limit the number of writes made to the SSD, where such writes can include writes incurred as a result of WA, such as by GC processing.

In at least one embodiment, the non-volatile SSDs providing BE non-volatile storage can include drives of one or more types or technologies. For example, the non-volatile SSDs can include any of multi-level cell (MLC) SSDs, triple-level cell (TLC) SSDs, single-level cell (SLC) SSDs, and/or quad-level cell (QLC) SSDs. An SLC SSD can store one bit of information per flash memory cell. An MLC SSD can store two bits of information per flash memory cell. A TLC SSD can store three bits of information per flash memory cell. A QLC SSD can store four bits of information per flash memory cell. In at least one embodiment, BE non-volatile storage can include QLC SSDs or drives alone or in combination with any of SLC, TLC and/or MLC SSDs or drives. The QLC drives can be a lower cost drive option than SLC, TLC and MLC drives. Use of QLC drives can be a desirable option for BE non-volatile storage in comparison, for example, to TLC drives since the QLC drives can provide read throughput similar to the move expensive TLC drives. However, the less expensive QLC drives generally have a lower endurance than SLC, TLC and MLC drives because a QLC drive stores more bits of data in each cell than the SLC, TLC and MLC drives. Thus, the QLC drives generally support a lower number of WPD than the SLC, TLC and MLC drives.

Generally, it can be desirable to limit writes to non-volatile SSDs of any suitable technology in efforts to reduce the drive wear. It can be desirable to reduce or limit writes to the non-volatile SSDs such as by limiting or reducing drive WA incurred as a result of GC processing. Additionally in a system using QLC drives, generally limiting writes to the QLC drives, such as by limiting or reducing WA, can be even more important or critical than limiting writes to TLC, SLC or MLC drives since the QLC drives generally have lower WPD limits that TLC, SLC and MLC drives.

Accordingly, the techniques of the present disclosure can be used to generally reduce the writes to storage devices. In at least one embodiment, the techniques of the present disclosure can be used to reduce WA of non-volatile storage devices such as non-volatile SSDs, where the WA can be reduced by selectively limiting when GC processing is performed. In at least one embodiment, the non-volatile SSDs can be included in BE non-volatile storage of a storage system or appliance. In at least one embodiment, the non-volatile SSDs can include drives of one or more suitable technologies or types. In at least one embodiment, the non-volatile SSD types or technologies can include any of SLC, MLC, TLC and QLC drives. The techniques of the present disclosure are not limited to any particular type or technology of storage device that may be provided herein for purposes of illustration.

Generally, the techniques of the present disclosure can be used in connection with any suitable storage device with a goal of reducing WA. In at least one embodiment using non-volatile SSDs having a limited number of WPD, it can be desirable to limit or reduce WA in order limit drive wear and avoid exceeding a target WPD limit in order to achieve an expected usable lifetime for the non-volatile SSDs.

In at least one embodiment, the techniques of the present disclosure can be used to implement and optimize GC policies that result in limiting, reducing and/or minimizing WA incurred as a result of GC processing to thereby limit, reduce and/or minimize corresponding wear on non-volatile SSDs used by an LSS of a storage system. In at least one embodiment, the non-volatile SSDs of the LSS can be included in BE non-volatile storage, where the non-volatile SSDs can include QLC drives. In at least one such embodiment, reducing WA of the QLC drives can be more critical, for example, relative to other non-SSD drive technologies or types, such as SLC, and TLC drives, due to the relatively lower WPD target or limit of QLC drives. However, the techniques of the present disclosure are generally applicable for use in embodiments with other drives types and technologies, including other SSD types, such as MLC, TLC and/or SLC drives, which can generally seek to reduce WA in order to limit drive wear.

Reducing the WA using the GC policies in at least one embodiment can result in tangible advantages and benefits. For example, reducing the WA using a GC policy in accordance with the techniques of the present disclosure can include reducing the background or extra I/Os performed when writing or storing new user content or data, thereby improving the I/O performance of the data storage system. As another example, reducing the WA using a GC policy in accordance with the techniques of the present disclosure can reduce the background or extra I/Os performed when writing new data, thereby generally reducing the SSDs' wear level. As a result, an embodiment of the techniques of the present disclosure can use GC policies that reduce WA and can prolong the lifetime of the SSDs used by the LSS. In at least one embodiment using the techniques of the present disclosure in one or more storage systems or appliances, the resulting I/O performance improvement, reduction in wear of the SSDs, and extended SSD lifetime can be characterized as tangible benefits desired by data storage system vendors and customers alike.

In at least one embodiment, a storage system can have multiple hosts connected thereto running various different applications. Each of the applications can generate data with a different corresponding I/O profile. An I/O profile, such as related to one or more applications, can generally describe one or more characteristics related to the I/Os issued by the one or more corresponding applications whose stream of issued I/Os is described by the I/O profile. If the storage system implements an LSS for storing the data or content of the applications, the various I/O profiles of various corresponding applications can result in varying corresponding GC costs. For example, a sequential write to a logical address followed by a sequential overwrite to the same logical address can have zero associated GC costs. In contrast, random overwrites with no temporal locality, such as with respect to user logical address space, can result in significant GC costs. In at least one embodiment and consistent with other discussion herein, such GC costs can include added adverse performance costs and also increased WA that can, in turn, lead to faster SSD wear out with increased WPD over a specified maximum limit.

One straightforward approach or solution, with goals of reducing GC costs and reducing SSD wear, can include optimization of a flush rate and/or optimization of a GC rate. The flush rate can denote the rate at which dirty write data is drained from a dirty write cache or log. The GC rate can denote a rate at which free segments are generated by GC processing. Some approaches can utilize a greedy algorithm that can result in storing data or content of multiple I/O profiles in the same segment of BE non-volatile storage. Even though the greedy algorithm makes decisions or choices that can seem beneficial in the immediate term, the overall GC costs can still be significantly more than desired. Put another way, intermixing different classes of data or content based on different corresponding I/O profiles can lead to increased GC and increased WA.

Accordingly, in at least one embodiment, the techniques of the present disclosure can be utilized that provide for minimizing GC cost in a system in which content or data is stored based on various different I/O profiles. In at least one embodiment, the techniques of the present disclosure provide for separating or segregating user data or content into various classes, where each of the classes can have a different corresponding I/O profile. In at least one embodiment, the techniques of the present disclosure can reduce and minimize GC costs related to WA, SSD wear, and the added adverse performance impact due to GC processing where GC processing can be performed using BE non-volatile storage segments only including a single class or type of data corresponding to a single I/O profile.

In at least one embodiment, the techniques of the present disclosure can reduce GC costs by separating different types of user, client or application data into different corresponding data streams, where each such data stream can be stored in its own sub LSS on the storage system. Each type or class of data can have a corresponding I/O profile that characterizes the type or class of data. In at least one embodiment, data or content of the same class or type can be stored in the same sub LSS. In at least one embodiment, the techniques of the present disclosure can provide for modulating the GC costs of each class such that the overall system GC cost can be reduced. In at least one embodiment, GC processing to generate free segments of BE non-volatile storage of a particular class or type can be performed using only partially filled segments of the particular class or type.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more non-volatile solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, any of: SLC, MLC, TLC and/or QLC drives.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PD 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
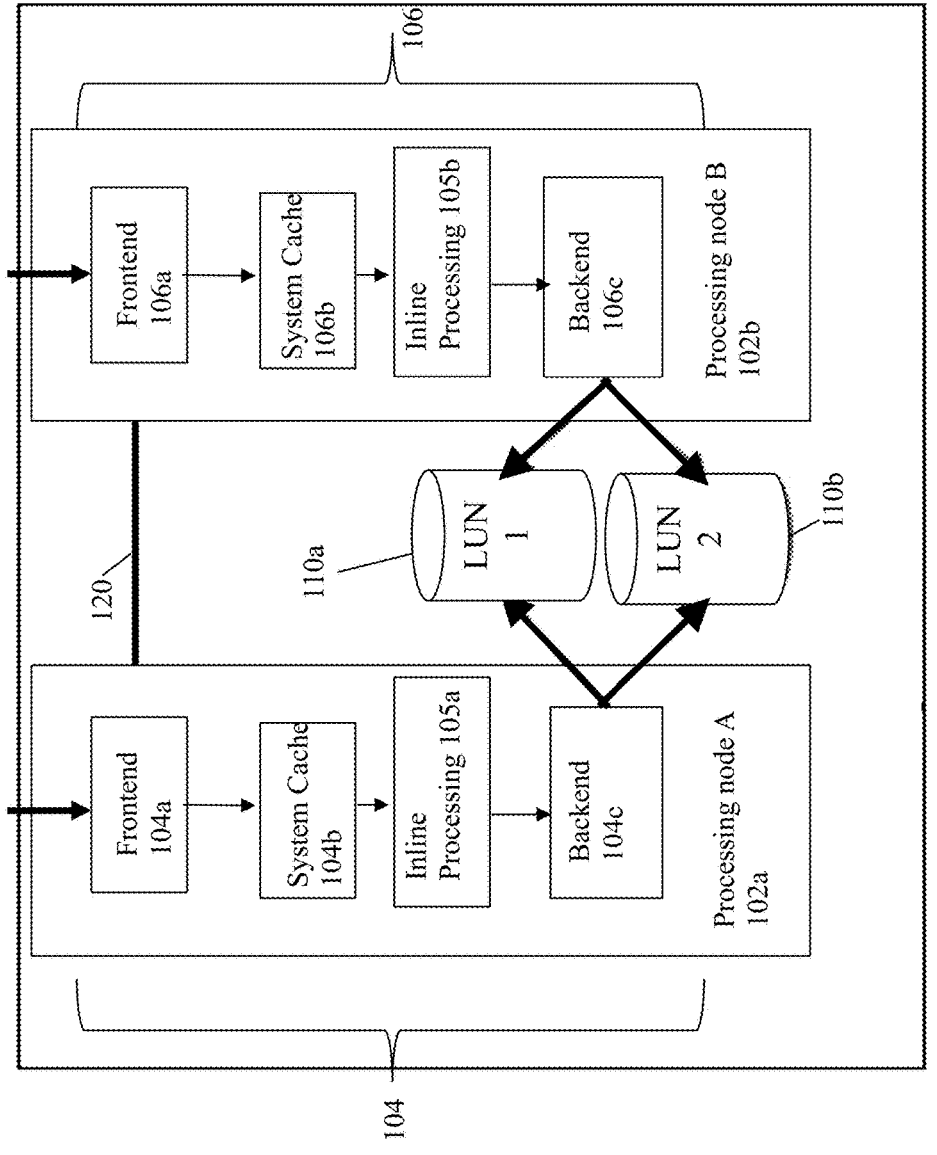
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
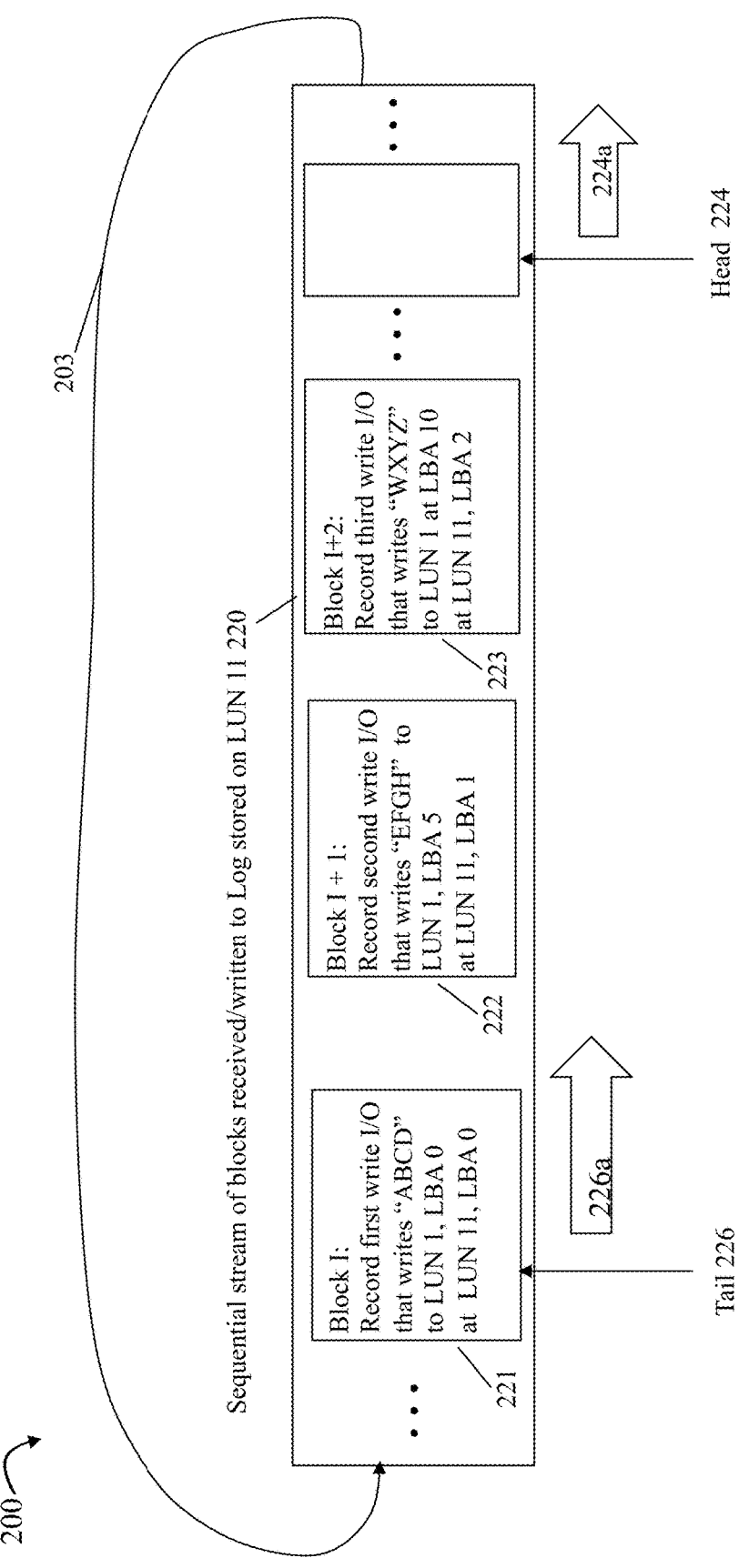
FIGS. 3, 4, 5 and 6 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
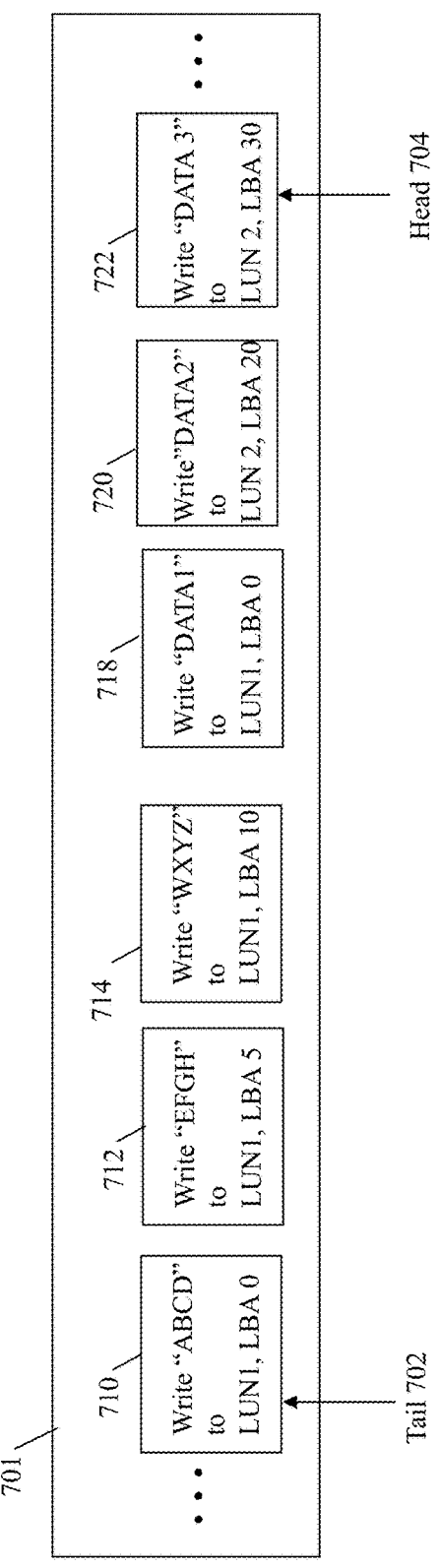

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
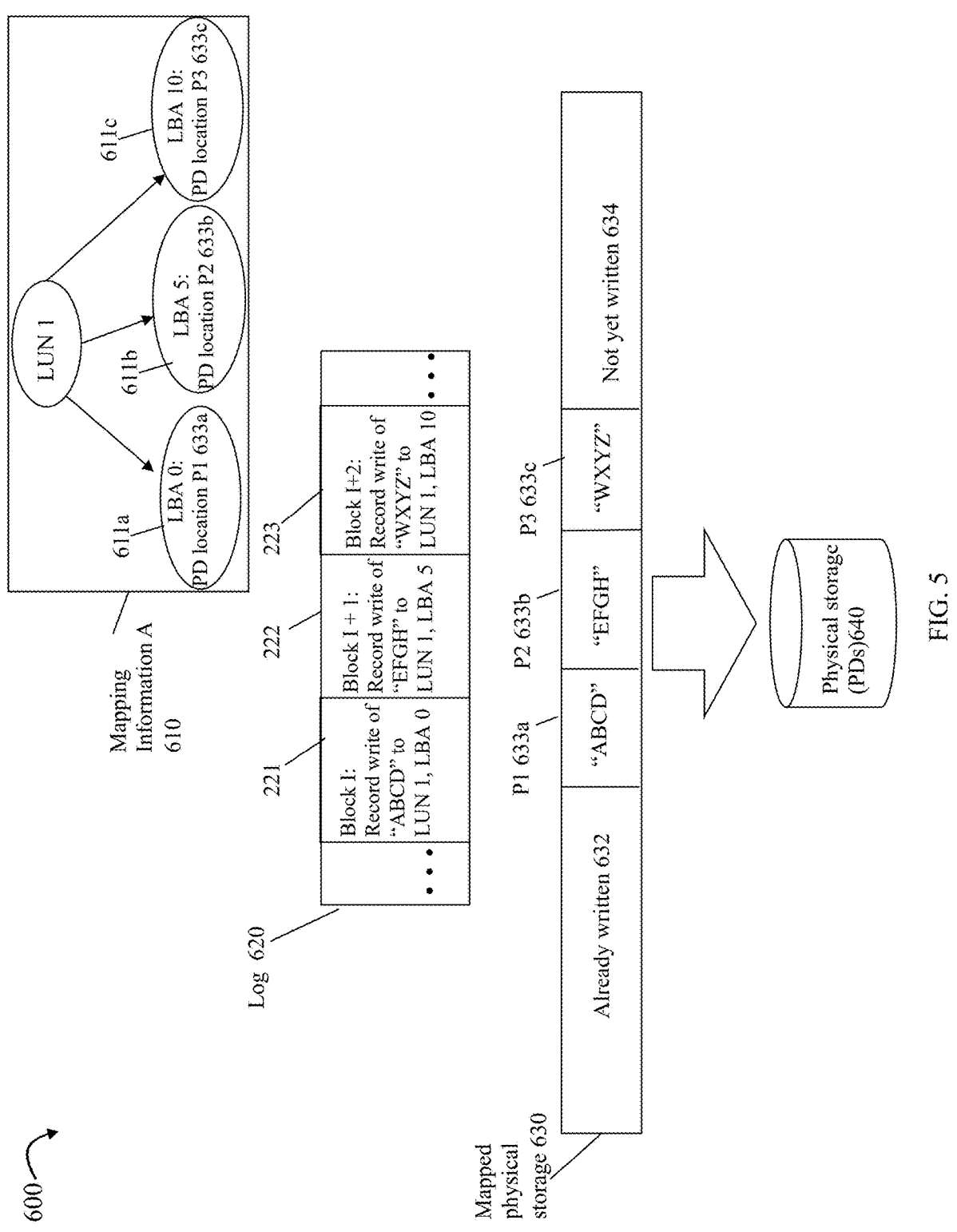

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system (or LSS) as discussed herein, as recorded writes in the log are processed and flushed from the log, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs.

Figure 6:
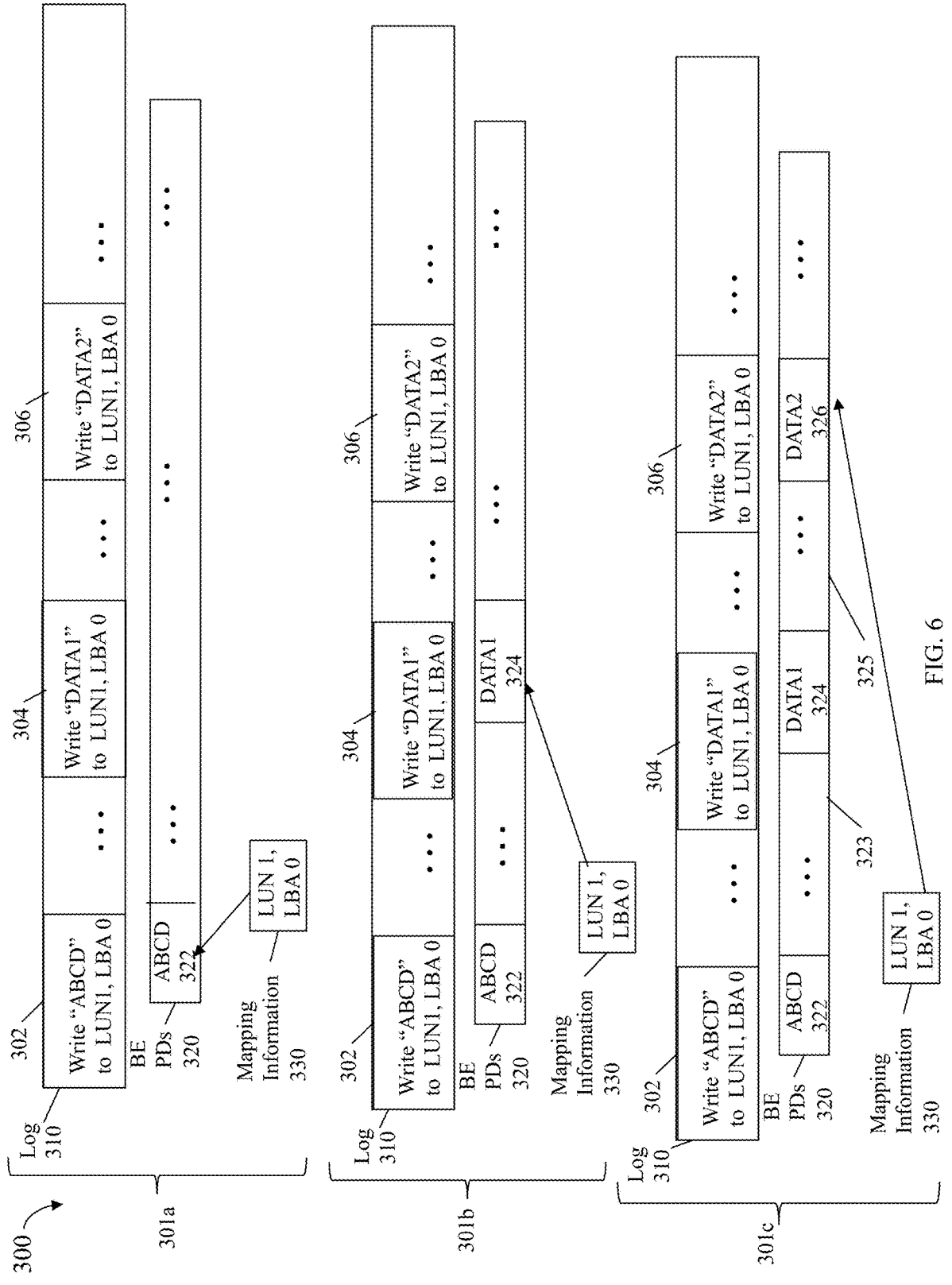

For example with reference to FIG. 6, the element 301a can denote the state of the log file 310, BE PDs 320 and mapping information 330 at a first point in time T1 after processing the record 302 for a first write of "ABCD" to the logical address LUN A, LBA 0. The data written "ABCD" by the recorded write of 302 can be stored at the BE PD location 322. Thus, flushing the log record 302 results in storing the write data "ABCD" to the BE PD location 322 and additionally updating the mapping information 330 to reference the BE PD location 322. The mapping information 330 denotes the metadata used to map the logical address LUN 1, LBA 0 to the current physical location on the BE PDs containing the user data or content stored at the logical address LUN 1, LBA 0. After the log record 302 is flushed from the log 310, the record 302 is available and can be subsequently reclaimed for reuse for logging other operations in the log 310.

At a second point in time T2 subsequent to T1, the log record 304 can be processed and flushed to the BE PDs 320. The element 301b denotes the state of the log file 310, BE PDs 320 and mapping information 330 at the second point in time T2 after processing the record 304 for a second write of "DATA1" to the logical address LUN A, LBA 0. The data written "DATA1" by the recorded write of 304 can be stored at the BE PD location 324. Thus, flushing the log record 304 results in storing the write data "DATA1" to the BE PD location 324 and additionally updating the mapping information 330 to reference the BE PD location 324 denoting the physical location containing the data stored at the LUN 1, LBA 0 at the time T2. Additionally, the PD location 322 can be invalidated since it no longer contains valid current data for the logical address LUN 1, LBA 0, whereby the PD location 322 can be available for reuse. After the log record 304 is flushed from the log 310, the record 304 is available and can be subsequently reclaimed for reuse for logging other operations in the log 310.

At a third point in time T3 subsequent to T2, the log record 306 can be processed and flushed to the BE PDs 320. The element 301c denotes the state of the log file 310, BE PDs 320 and mapping information 330 at the third point in time T3 after processing the record 306 for a third write of "DATA2" to the logical address LUN A, LBA 0. The data written "DATA2" by the recorded write of 306 can be stored at the BE PD location 326. Thus, flushing the log record 306 results in storing the write data "DATA2" to the BE PD location 326 and additionally updating the mapping information 330 to reference the BE PD location 326 denoting the physical location containing the data stored at the LUN 1, LBA 0 at the time T3. Additionally, the PD location 324 can be invalidated since it no longer contains valid current data for the logical address LUN 1, LBA 0, whereby the PD location 324 can be available for reuse. After the log record 306 is flushed from the log 310, the record 306 is available and can be subsequently reclaimed for reuse for logging other operations in the log 310.

As illustrated by the elements 301a-c, over time, the physical storage locations 322, 324 of the BE PDs 320 become free and available for reuse. The other physical storage locations 323, 325 and 326 can still contain valid data. Thus, the free, available reusable physical storage locations 322, 324 can form holes or segments interspersed among the other portions 323, 325, 326 containing valid data. More generally, the size of the holes 322, 324 can be of varying sizes and can include multiple user data blocks or pages. Additionally, portions of physical storage of the BE PDs can also be similarly allocated and then freed for reuse for other purposes. Thus, the holes of free, reusable physical storage as well other portions of physical storage including valid data can result not only from flushing the log file but also from other purposes that can vary with embodiment.

In data storage systems implementing an LSS such discussed herein, garbage collection (sometimes referred to as GC) can be performed by the data storage system at various times in an embodiment. Garbage collection processing can be performed by the data storage system on the BE PDs to aggregate allocated stored data blocks with valid data to eliminate free unused physical storage locations (containing invalid or stale content) that can be interspersed between the data blocks containing valid data. Such aggregation can include physically copying or moving data blocks of valid user data stored at various physical locations on BE nonvolatile storage into a single larger physical storage location. From the perspective of the data storage system, valid data can include the current or most recent copy of client-based write data such as host-based write data (e.g., written by write I/Os received from one or more hosts), as well as the current or most recent copy of flushed metadata, such as the mapping information used by the data storage system to locate a current copy of content associated with a logical address such as, for example, of a read or write I/O operation. After the valid data blocks, such as 323, 325 and 326 at the time T3, are relocated from their source locations, the storage locations 322, 323, 324, 325 and 326 denote a larger contiguous chunk of storage that is free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

A specified size or chunk of physical storage of the BE PDs can be referred to as a physical large block or PLB. In at least one embodiment, garbage collection can be performed on physical storage units that are PLBs. In at least one embodiment, each PLB can be 2 MBs (megabytes) in size. Within a single PLB, the valid data and the holes (e.g., containing invalid data or designated as an unused portion) can be interspersed since, for example, write granularity size units can be a smaller size such as 4K chunks or blocks.

Utilization (U), such as of a single PLB, can be expressed as a percentage or ratio of allocated consumed storage that contains valid data with respect to the total storage capacity of the PLB. For example, if 25% of the PLB is allocated and includes valid data and the remaining 75% of the PLB is unused and free (e.g., contains invalid data or holes of unused storage), the utilization for the single PLB is 25%. Generally, the lower the per PLB utilization, the more efficient the garbage collection since larger amounts of free capacity are reclaimed and aggregated from PLBs with lower utilization. Additionally, in connection with GC in at least one embodiment, it can be desirable to move content from source PLBs having low PLB utilization since the lower the PLB utilization, the less amount of valid content to be moved. For example, consider 2 source PLBs that contain a mixture of 50% valid data and 50% invalid data or holes (e.g., each PLB has a 50% utilization with the remaining 50% of the PLB containing invalid or free holes of storage). Garbage collection can be performed to consolidate the valid data in the 2 source PLBs into a single target PLB by copying the valid data from the 2 source PLBs to the target PLB. The foregoing consolidation results in a net gain of 1 free PLB by freeing the 2 source PLBs, and consuming or using the single target PLB that contains the consolidated valid data from the 2 original source PLBs. As another example, consider 4 source PLBs each having a 25% utilization (e.g., each PLB contains 25% valid data with the remaining 75% of the PLB containing invalid or free holes of storage). In this case, garbage collection can be performed to consolidate the valid data of the 4 source PLBs into a single target PLB by copying the valid data from the 4 source PLBs to the target PLB. The foregoing consolidation results in a net gain of 3 free PLBs by freeing the 4 source PLBs, and consuming or using the single target PLB that contains the consolidated valid data from the 4 original source PLBs. In this latter scenario, the same amount of valid data or content is moved to the single target PLB as in the former scenario (with 2 source PLBs each having 50%

PLB utilization), but the latter scenario results in a net gain of 3 PLBs in comparison to a net gain of 1 PLB in the former scenario.

In a data storage system implementing an LSS, garbage collection can be performed by the data storage system in a continuous manner to manage its BE PDs and reclaim physical storage of holes including unused storage or storage with invalid data. The garbage collection results in performing additional overhead operations such as additional read and write operations in connection with reading valid data from the source PLBs and writing the valid data of the source PLBs to a target PLB. The total writes performed by the data storage system in connection with writing new valid data (e.g., such as data written by a host) to a single unit of storage includes the overhead or additional writes performed by the data storage system in connection with garbage collection and management of the system's BE PDs in order to free the single unit of storage, such as the single PLB, given that the source PLBs from which the valid data is read have a certain PLB utilization.

WA can include the additional writes performed in connection with such GC processing. In at least one embodiment, GC processing can run when the system has idle cycles, or more generally, time periods of no workload or a minimal workload (e.g., such as less than a specified minimum workload or utilization measured using any one or more suitable metrics). In at least one embodiment, GC can run with a goal of generating one or more free PLBs (e.g., with 0% utilization). In at least one embodiment, each PLB can have a size such as 2 MBs, or more generally, any other suitable size. In at least one embodiment, a PLB can have a size selected in connection with the size of a stripe of data or content that can be written across multiple BE PDs included in a RAID configuration. In at least one embodiment, content or data can be written to BE PDs in PLB size units. In this manner in at least one embodiment, a PLB can denote a single stripe of storage.

In at least one embodiment GC processing can include combining N (where N is generally an integer greater than one) partially filled or populated source PLBs (e.g., partially filled with valid data or content), where the valid data is moved from the source PLBs to one more target free PLBs to generate at least 1 net free PLB. The valid data copied or moved by GC processing causes additional writes included in the WA on the drives. Excessive WA can lead to excessive drive-wear of non-volatile SSD drive types. The WA can be characterized as proportional to the utilization (U) of the PLBs used in the GC operation. For example, in a first scenario, four 25% utilized sources PLBs can be garbage collected to create 3 free PLBs; and in a second scenario two 50% utilized PLBs garbage collected to generate one free PLB. Both the foregoing first and second scenarios move or copy the same amount of valid data or content. However, the foregoing first scenario results in generating a larger number of net free PLBs than the foregoing second scenario. As a result in at least one embodiment, GC processing can select to perform GC processing in accordance with the first scenario noted above rather than the second scenario noted above. In particular in at least one embodiment, GC processing can select source PLBs having the lowest utilization for combining valid content thereof on generally one or more free target PLBs. For example in at least one embodiment where there are source PLBs having both 25% utilization and also 50% utilization, GC processing can select four 25% utilized source PLBs from which to aggregate valid content to a single target free PLBs.

Accordingly, in at least one embodiment in accordance with the techniques of the present disclosure, the number of GC operations performed and the quality of PLBs selected as source PLBs can play an important role in controlling WA of the drives. The quality of a PLB can relate to the utilization (U) and/or percentage of the PLB storage capacity that is free (F) or unused, as discussed below in more detail. Generally in at least one embodiment, a first PLB can be characterized as having a higher quality than a second PLB with respect to GC processing if the first PLB has a first utilization or U value that is less than a second utilization or U value of the second PLB.

In at least one embodiment, the techniques of the present disclosure can result in optimizing and reducing the amount of GC processing performed to thereby reduce corresponding additional writes performed. The additional writes performed in connection with GC can be included in WA. Thus by reducing GC processing in at least one embodiment, WA is reduced to thereby result in a reduction on drive wear with respect to non-volatile SSDs of BE non-volatile storage used by an LSS of a storage system.

Consistent with the above discussion, new valid data can be written to a free PLB as corresponding recorded write operations are flushed from a log. In order to obtain the free PLB in an LSS, the data storage system can perform additional or extra writes as part of its GC processing to manage the BE PDs. The additional writes included in the WA are thus generated internally by the data storage system's GC processing performed for BE PD management.

As noted above, a PLB can be characterized as having a specified utilization (U) denoting a percentage of storage of the PLB storing valid content of data. A PLB can also be characterized as having a specified percentage of free or unused capacity F of the source PLBs. In one aspect, F can be characterized and expressed as U's complement.

Generally, the utilization, U, can be expressed as a percentage as noted above with respect to a total capacity, T, denoting 100% or 1. Thus, the total capacity T can denote 1.0 or 100% can be expressed using the utilization U and its complement, the free or unused storage capacity, F, as in EQUATION 1:

$$F+U=1 \hspace{3cm} \text{EQUATION 1}$$

Also, the EQUATION 1A follows from EQUATION 1, $$F=1-U \hspace{3cm} \text{EQUATION 1A}$$

To further illustrate write amplification WA with respect to GC performed by the data storage system in connection with managing the storage of its BE PDs such as in an LSS, consider values for F of the source PLBs as well as value for U or utilization of the source PLBs with reference to FIG. 7.

In at least one embodiment, a PLB may have a utilization or U=100% at a point in time where the PLB stores valid first content for multiple logical addresses. At a later point in time as new content is written to the multiple logical addresses as corresponding writes are flushed from the log, portions of the valid first content can become stale or invalid. Thus the PLB's utilization tends to generally decrease with time as its content becomes stale, whereby the PLB can be characterized as a partially filled PLB including holes of unused storage of invalid, stale content interspersed among other valid data. In at least one embodiment, GC processing can include generally combining valid content of multiple partially filled source PLBs into a highly utilized target PLB to generate one or more free PLBs.

Referring to FIG. 7, shown is a table 400 of various values and scenarios in connection with generating 1 net free PLB as part of garbage collection processing in a LSS in an embodiment in accordance with the present disclosure. The table 400 includes the column 402 of various values for F denoting different percentages of free or unused PLB storage; the column 403 of various values of U denoting different percentages of consumed or used PLB storage containing valid content or data; the column 404 denoting the number of source PLBs needed to generate 1 net free PLB that can be used to store new data (e.g., newly written host or other client data); and the column 406 denoting the number of target PLBs needed to generate 1 net free PLB that can be used to store new data (e.g., newly written host or other client data). Each row 408-414 of values denotes a number of source PLBs (404) and target PLBs (406) needed to generate 1 net free PLB, where each of the source PLBs has a specified value for F (404) denoting a percentage of free or unused storage of each source PLB. For a given row of the table 400, the column 404 denotes the number of source PLBs from which valid data is read and then written to one of the number of target PLBs (denoted by column 406) to consolidate the valid data of the source PLBs into the target PLBs.

Within each row 408, 410, 412 and 414, the U and F values of the same respective row equal 100% denoting the total capacity of a single source PLB. The U and F values of the same respective row are in accordance with EQUA-TIONs 1 and 1A above.

The row 408 indicates that 2 source PLBs (column 404) that each contain 50% (column 402) of free or unused storage capacity (or 50% utilization column 403) can have all their valid data copied to a single target PLB (column 406).

The row 410 indicates that 3 source PLBs (column 404) that each contain 33% (column 402) of free or unused storage capacity (or 67% utilization column 403) can have all their valid data copied to two PLBs (column 406).

The row 412 indicates that 4 source PLBs (column 404) that each contain 25% (column 402) of free or unused storage capacity (or 75% utilization column 403) can have all their valid data copied to three PLBs (column 406).

The row 414 indicates that 10 source PLBs (column 404) that each contain 10% (column 402) of free or unused storage capacity (or 90% utilization column 403) can have all their valid data copied to nine PLBs (column 406).

Generally in at least one embodiment, a first PLB can be characterized as having a higher quality than a second PLB with respect to GC processing if the first PLB has a first utilization or U value that is less than a second utilization or U value of the second PLB, where the first and second U values denote respective percentages of PLB capacity that are consumed, used and/or store valid content. Generally in at least one embodiment, a first PLB can be characterized as having a higher quality than a second PLB with respect to GC processing if the first PLB has a first F value that is more than a second F value of the second PLB, where the first and second F values denote respective percentages of PLB capacity that are free, unused and/or store invalid or stale content.

As further illustrated in connection with FIG. 7, it can be seen that selecting source PLBs with lower or lowest utilization (U values) of all source PLB candidates, and selecting higher or highest F values of all source PLB candidates can be performed in connection with GC processing in efforts to reduce or minimize the additional GC writes performed when generating net free PLBs. For example, as can be seen in connection with FIG. 7, the amount of valid content moved or copied from source PLBs to generate a single free PLB increases as the U values of the source PLBs increases. In a similar manner, as can be seen in connection with FIG. 7, the amount of valid content moved or copied from source PLBs to generate a single free PLB increases as the F values of the source PLBs decreases. With respect to FIG. 7, the foregoing denotes the ordering of the rows of the table in the example 400 from "least amount of valid content copied or moved by GC processing" to most amount of valid content copied or moved by GC processing" in order to generate a single net free PLB: 408, 410, 412 and 414 (where 408 has the least amount of valid content copied or moved by GC processing, of all rows 408, 410, 412 and 414, to generate a single net free PLB; and where 414 has most amount of valid content copied or moved by GC processing, of all rows 408, 410, 412 and 414, to generate a single net free PLB). In at least one embodiment where partially filled source PLBs are available as candidates for GC processing, GC processing can select partially filled source PLBs as those having the smallest or lowest U values of all PLB candidates.

It should be noted that FIG. 7 illustrates various scenarios where valid content from multiple partially filled source PLBs are combined and stored on one or more target PLBs to generate one net free PLB. More generally, GC processing in at least one embodiment can combine valid content from multiple partially filled source PLBs and store the combined valid content on one or more target PLBs to generate one or more net free PLBs. Some examples where more than one net free PLB can be generated by GC processing are discussed elsewhere herein. For example in at least one embodiment as noted above four source PLBs having 25% utilization can have their valid content moved to a single free target PLB thereby generating 3 net free PLBs.

In addition to using techniques of the present disclosure to limit or reduce WA in connection with GC processing and policies, the techniques of the present disclosure can also be used to limit or reduce WA in connection with another operation referred to herein as compact and append.

In at least one embodiment, compact and append (sometimes referred to herein as CA or C and A) can be characterized as an operation that can be optionally performed during flushing. Put another way, CA is an operation that, in at least one embodiment, can be performed while the system is flushing entries from the log. CA processing in at least one embodiment does not result in one or more net free PLBs that are completely free and available for reuse. CA processing can include having a single source PLB that is partially filled with valid content and also contains holes of unused storage. Consistent with other discussion herein, the holes of unused storage can include, for example, invalid or stale content of a first logical address in an LSS that has been replaced with more recently written new content to the first logical address. CA processing can use a partially filled source PLB where CA processing includes copying or moving valid content or data within the partially filled source PLB such that the valid content on the PLB is compacted and stored in consecutive contiguous locations. Put another way, as a result of compacting content of the partially filled PLB in CA processing, the valid content of the PLB is stored in a single contiguous region at one end of the PLB thereby removing any holes that were previously interspersed between valid data portions. After compaction of CA processing, all unused storage of the PLB is also compacted as a single contiguous region of the PLB. In this manner, the single contiguous region of unused storage of the PLB (also including the compacted single contiguous region of valid content) can subsequently be reused for storing or appending newly written content or data of recorded write operations flushed from the log. For example, if a partial PLB has CA processing that can be performed in at least one embodiment is illustrated in FIG. 8 discussed below.

Figure 8:
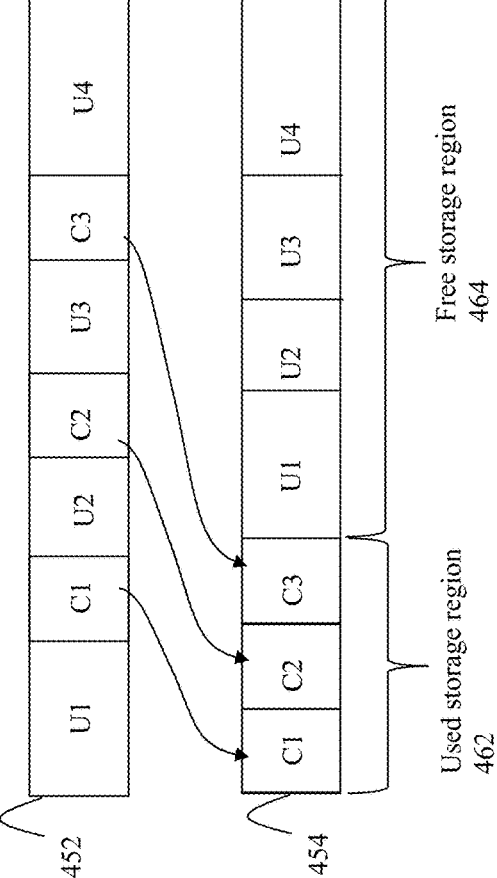
FIG. 8 is an example illustrating compaction of valid content of a partially filled storage block that can be performed in at least one embodiment in accordance with the techniques of the present disclosure.

With reference to the example 450 of FIG. 8, the element 452 can denote a single PLB which is partially filled with valid content C1, C2 and C3. As can be seen in 452, C1, C2 and C3 are not stored contiguously in the PLB 450 such that the PLB 450 can have holes of invalid data or unused storage areas denoted as U1-U4. Thus, element 452 can denote the state of the PLB at a first point in time. Subsequent to the first point in time, a compaction operation can be performed with respect to the partially filled PLB 452 to store the content of the partially filled PLB in a contiguous region at one end of the PLB to eliminate interspersed holes of invalid content or unused storage. The element 454 illustrates the partially filled PLB after compaction where the existing content C1, C2 and C3 of the PLB 454 can be located in one contiguous region 462 with the remaining free storage region included in another contiguous region 464. After compaction of the PLB as illustrated in 454, newly written content of recorded write entries flushed from the log can be stored in the free region 464 of the partially filled PLB 454.

Subsequent to the compaction, the newly written content or data can be stored in the unused or free storage region 464 on the partially filled PLB 450 along with the compacted existing content (462) of the PLB 450. The processing performed in connection with FIG. 8 can also be referred to herein as compact and append or compaction and appending (e.g., C and A, or CA) 8 processing.

In at least one embodiment, the PLB 452 and 454 can denote the same PLB where compaction results in compacting valid content of a single PLB such that all valid content is stored in a single contiguous region at one end of the PLB, and where new content can then be appended to or stored in the remaining free storage that also now forms a second contiguous region of the PLB.

Alternatively, in at least one embodiment, the PLB 452 and the PLB 454 can also be 2 different PLBs where the PLB 452 denotes a source PLB that is partially filled with valid content, and where the PLB 454 denotes a target PLB that can be a free PLB (e.g., PLB utilization or U=0%, free or F=100%). In this case, the compaction operation aggregates the content C1-C3 of the source PLB 1452 and stores the aggregated content C1-C3 as a compacted single contiguous data portion (1462) on the target PLB 1454 at one end of the PLB 1454. Subsequently additional content can be appended to the existing content of used storage region 1462, where the additional content can be stored in the free storage region 1464.

In at least one embodiment, compaction as discussed in connection with FIG. 8, and more generally CA processing, can be performed if the current number of free PLBs (e.g., each having U=0% or F=100%) is less than a minimum threshold. In at least one embodiment, CA processing can be performed during flushing and can adversely impact flush processing or performance. In at least one embodiment, CA processing can be performed concurrently or in parallel while also flushing recorded writes and possibly other recorded operations from the log. Additionally, performing CA processing results in additional writes or WA incurred as a result of moving or copying valid data in connection with the CA processing. As such, it can be desirable to selectively limit when CA processing is performed in efforts to reduce WA incurred as a result of CA processing.

In at least one embodiment in a multicore or multiprocessor system, compaction (of CA processing) can be performed on a first core or CPU in parallel while a second core or CPU flushes recorded entries from the log. Once a partially filled PLB B1 has been compacted, the unused portion or region of B1 can then be used to store newly written content as corresponding writes are flushed from the log.

In at least one embodiment, compaction as described herein in connection with CA processing can be triggered when the current number of free PLBs of non-volatile BE PDs (available for storing CA min free PLBs) falls below a minimum threshold. In at least one embodiment, CA processing can continue to be performed during flushing until the current number of free PLBs is above the minimum threshold. As a variation, once CA processing is triggered by the current number of free PLBs falling below the minimum threshold, CA processing can continue to be performed until the current number of free PLBs reach a specified quantity Q1, where Q1 can generally be some specified amount above the minimum threshold.

In at least one embodiment of the techniques of the present disclosure, GC processing can be performed when the system has idle cycles or more generally a sufficiently low workload or utilization below a specified threshold. In at least one embodiment of the techniques of the present disclosure, GC processing can be performed if the number of free PLBs available for storing content written by writes flushed from the log is below a specified minimum.

Generally, log structured stores or systems (LSSs) can be characterized by allowing new writes to be directed to free or unused storage on a data storage device, and by performing garbage collection (GC) that allows holes of storage including unused or invalid data to be compacted and reused. In an LSS, as newly written data provides updated values for existing data stored at a logical address, the newly written data can be stored at a new physical address or location on back-end (BE) non-volatile storage rather than overwriting or performing an "in place" update of a first storage location on BE non-volatile storage, where the first storage location contains the existing data of the logical address. After writing the new data to the logical address, where the new data is stored at the new physical address or location, the existing data stored at the first storage location can be old, stale or invalid. The LSS can perform GC processing to reclaim the first storage location containing the stale, invalid data. As a result of performing GC processing, the first storage location can be reclaimed, freed and made available for reuse.

Modern data storage systems can implement an LSS. The LSS as implemented by a data storage system can have its own components, for example, to maintain a log, perform logical to physical address translation using its own metadata, to perform GC processing, to perform storage management controlling data placement, to perform metadata management, and the like. Additionally, such modern data storage system can also utilize non-volatile BE storage which includes one or more non-volatile solid state storage devices or SSDs. In an LSS, newly written content to a logical address can be written to a new physical storage location on the BE SSDs. As noted above, the new content replaces the existing content of the logical address, where the existing content can be stored at another BE SSD storage location that is different from the new physical storage location of the newly written content of the logical address.

The LSS of the data storage system encounters write amplification (WA) which can generally be characterized as additional writes performed in order to write or store a single unit of valid data. The WA can occur generally due to the nature of operation of the LSS, such as noted above, due to 1) the LSS storing newly written content to a logical address at a new physical address or location each time there is an update or write to the logical address; and then 2) the GC processing performed to reclaim storage of stale invalid content, where the reclaimed storage can be made free and available for reuse. The GC processing performed by the storage system can include data movement or copying of valid content between BE storage chunks or portions in efforts to create or generate free BE storage chunks or portions for re-use. Although data stored at logical addresses can be written at a first point in time to sequentially contiguously located BE storage locations, as existing data of logical addresses is replaced with newly written content, existing data can become stale and invalid and can create holes of invalid data portions interspersed among valid data portions. As a result, GC processing can be performed to consolidate such valid data portions from multiple storage chunks also including invalid data portions to result in obtaining one or more free storage chunks. For example, GC processing can use two source chunks partially populated with valid content and a single target chunk that is completely free (e.g., storage of entire chunk is free and unused). GC processing can combine the valid content from the two source chunks and store the collective valid content of the two source chunks in the single target chunk, thereby generating one net free chunk. WA can include the additional writes performed by such GC processing to move or copy the valid content from the two source chunks to the single target chunk, where the additional writes can be performed in addition to previously writing the valid content to the source chunks such as a result of flushing a log of recorded write operations. The additional writes of WA can be characterized as an additional cost incurred in connection with storage management and policies of the LSS.

In this manner, the WA including the additional writes incurred as a result of GC can contribute to additional usage and wear of the BE storage devices or drives such as non-volatile SSDs. The non-volatile SSDs may only support a limited number of writes per day (WPD) in efforts to limit the wear on the SSDs in order for the SSDs to have at least a specified expected usable lifetime. Exceeding the WPD limit of an SSD can result in reducing the expected usable lifetime of the SSD. As a result to maintain or extend the expected usable lifetime of an SSD, there is motivation to generally reduce or limit the number of writes made to the SSD, where such writes can include writes incurred as a result of WA, such as by GC processing.

In at least one embodiment, the non-volatile SSDs providing BE non-volatile storage can include drives of one or more types or technologies. For example, the non-volatile SSDs can include any of multi-level cell (MLC) SSDs, triple-level cell (TLC) SSDs, single-level cell (SLC) SSDs, and/or quad-level cell (QLC) SSDs. An SLC SSD can store one bit of information per flash memory cell. An MLC SSD can store two bits of information per flash memory cell. A TLC SSD can store three bits of information per flash memory cell. A QLC SSD can store four bits of information per flash memory cell. In at least one embodiment, BE non-volatile storage can include QLC SSDs or drives alone or in combination with any of SLC, TLC and/or MLC SSDs or drives. The QLC drives can be a lower cost drive option than SLC, TLC and MLC drives. Use of QLC drives can be a desirable option for BE non-volatile storage in comparison, for example, to TLC drives since the QLC drives can provide read throughput similar to the move expensive TLC drives. However, the less expensive QLC drives generally have a lower endurance than SLC, TLC and MLC drives because a QLC drive stores more bits of data in each cell than the SLC, TLC and MLC drives. Thus, the QLC drives generally support a lower number of WPD than the SLC, TLC and MLC drives.

Generally, it can be desirable to limit writes to non-volatile SSDs of any suitable technology in efforts to reduce the drive wear. It can be desirable to reduce or limit writes to the non-volatile SSDs such as by limiting or reducing drive WA incurred as a result of GC processing. Additionally in a system using QLC drives, generally limiting writes to the QLC drives, such as by limiting or reducing WA, can be even more important or critical than limiting writes to TLC, SLC or MLC drives since the QLC drives generally have lower WPD limits that TLC, SLC and MLC drives.

Accordingly, the techniques of the present disclosure can be used to generally reduce the writes to storage devices. In at least one embodiment, the techniques of the present disclosure can be used to reduce WA of non-volatile storage devices such as non-volatile SSDs, where the WA can be reduced by selectively limiting when GC processing is performed. In at least one embodiment, the non-volatile SSDs can be included in BE non-volatile storage of a storage system or appliance. In at least one embodiment, the non-volatile SSDs can include drives of one or more suitable technologies or types. In at least one embodiment, the non-volatile SSD types or technologies can include any of SLC, MLC, TLC and QLC drives. The techniques of the present disclosure are not limited to any particular type or technology of storage device that may be provided herein for purposes of illustration.

Generally, the techniques of the present disclosure can be used in connection with any suitable storage device with a goal of reducing WA. In at least one embodiment using non-volatile SSDs having a limited number of WPD, it can be desirable to limit or reduce WA in order limit drive wear and avoid exceeding a target WPD limit in order to achieve an expected usable lifetime for the non-volatile SSDs.

In at least one embodiment, the techniques of the present disclosure can be used to implement and optimize GC policies that result in limiting, reducing and/or minimizing WA incurred as a result of GC processing to thereby limit, reduce and/or minimize corresponding wear on non-volatile SSDs used by an LSS of a storage system. In at least one embodiment, the non-volatile SSDs of the LSS can be included in BE non-volatile storage, where the non-volatile SSDs can include QLC drives. In at least one such embodiment, reducing WA of the QLC drives can be more critical, for example, relative to other non-SSD drive technologies or types, such as SLC, and TLC drives, due to the relatively lower WPD target or limit of QLC drives. However, the techniques of the present disclosure are generally applicable for use in embodiments with other drives types and technologies, including other SSD types, such as MLC, TLC and/or SLC drives, which can generally seek to reduce WA in order to limit drive wear.

Reducing the WA using the GC policies in at least one embodiment can result in tangible advantages and benefits. For example, reducing the WA using a GC policy in accordance with the techniques of the present disclosure can include reducing the background or extra I/Os performed when writing or storing new user content or data, thereby improving the I/O performance of the data storage system. As another example, reducing the WA using a GC policy in accordance with the techniques of the present disclosure can reduce the background or extra I/Os performed when writing new data, thereby generally reducing the SSDs' wear level. As a result, an embodiment of the techniques of the present disclosure can use GC policies that reduce WA and can prolong the lifetime of the SSDs used by the LSS. In at least one embodiment using the techniques of the present disclosure in one or more storage systems or appliances, the resulting I/O performance improvement, reduction in wear of the SSDs, and extended SSD lifetime can be characterized as tangible benefits desired by data storage system vendors and customers alike.

In at least one embodiment, a storage system can have multiple hosts connected thereto running various different applications. Each of the applications can generate data with a different corresponding I/O profile. An I/O profile, such as related to one or more applications, can generally describe one or more characteristics related to the I/Os issued by the one or more corresponding applications whose stream of issued I/Os is described by the I/O profile. If the storage system implements an LSS for storing the data or content of the applications, the various I/O profiles of various corresponding applications can result in varying corresponding GC costs. For example, a sequential write to a logical address followed by a sequential overwrite to the same logical address can have zero associated GC costs. In contrast, random overwrites with no temporal locality, such as with respect to user logical address space, can result in significant GC costs. In at least one embodiment and consistent with other discussion herein, such GC costs can include added adverse performance costs and also increased WA that can, in turn, lead to faster SSD wear out with increased WPD over a specified maximum limit.

One straightforward approach or solution, with goals of reducing GC costs and reducing SSD wear, can include optimization of a flush rate and/or optimization of a GC rate. The flush rate can denote the rate at which dirty write data is drained from a dirty write cache or log. The GC rate can denote a rate at which free segments are generated by GC processing. Some approaches can utilize a greedy algorithm that can result in storing data or content of multiple I/O profiles in the same segment of BE non-volatile storage. Even though the greedy algorithm makes decisions or choices that can seem beneficial in the immediate term, the overall GC costs can still be significantly more than desired. Put another way, intermixing different classes of data or content based on different corresponding I/O profiles can lead to increased GC and increased WA.

Accordingly, in at least one embodiment, the techniques of the present disclosure can be utilized that provide for minimizing GC cost in a system in which content or data is stored based on various different I/O profiles. In at least one embodiment, the techniques of the present disclosure provide for separating or segregating user data or content into various classes, where each of the classes can have a different corresponding I/O profile. In at least one embodiment, the techniques of the present disclosure can reduce and minimize GC costs related to WA, SSD wear, and the added adverse performance impact due to GC processing where GC processing can be performed using BE non-volatile storage segments only including a single class or type of data corresponding to a single I/O profile.

In at least one embodiment, the techniques of the present disclosure can reduce GC costs by separating different types or classes of user, client or application data into different corresponding data streams, where each such data stream can be stored in its own sub LSS on the storage system. Each type or class of data can have a corresponding I/O profile that characterizes the type or class of data. In at least one embodiment, data or content of the same class or type can be stored in the same sub LSS. In at least one embodiment, the techniques of the present disclosure can provide for modulating the GC costs of each class such that the overall system GC cost can be reduced. In at least one embodiment, GC processing to generate free segments of BE non-volatile storage of a particular class or type can be performed using only partially filled segments of the particular class or type.

The foregoing and other aspects of the techniques of the present disclosure are described in more detail in the following paragraphs.

In at least one embodiment, BE non-volatile storage can be organized in units based on ubers, sub-ubers (SUs) and PLBs. In at least one embodiment, an uber can denote 64 GB of contiguous storage, an SU can correspond to 8 GB of contiguous storage so that there can be 8 SUs in each uber. Consistent with other discussion herein in at least one embodiment, a PLB can correspond to 2 MB of contiguous storage, where each SU can be further partitioned into PLBs.

The following paragraphs can include examples with reference to uber, SUs, and PLBs. More generally, the techniques of the present disclosure can be utilized in connection with any suitable sized storage units.

When data is written in an LSS, an empty storage segment, such as a PLB, can be provided to flush dirty data and accomplish full stripe writes. For example, as recorded write I/Os of the log are flushed, the data or content written by the recorded writes can be stored in the PLB of BE non-volatile storage of the LSS. In at least one embodiment, if during flush processing there are no free PLBs, a partially free PLB or partial PLBs can be provided upon which to store the flushed write data.

In an LSS, as user data or content of corresponding logical addresses is overwritten and as various user or client storage entities, and portions thereof, are deleted, partial PLBs can also be generated. In at least one embodiment, the storage entities, or portions thereof, deleted can include, for example, volumes or logical devices (e.g., LUNs), snapshots, files, file systems, and/or directories. The partial PLBs can be garbage collected by GC processing to generate empty or free PLBs, where such free PLBs can be used in connection with flushing the log to store user data or content of flushed log entries corresponding to write I/Os from hosts or other storage clients.

As discussed above, GC processing can combine valid content of two or more PLBs to generate one or more free PLBs.

In accordance with the techniques of the present disclosure in at least one embodiment, there can be significant benefits resulting from not garbage collecting intermixed data or content from different classes or types having different corresponding I/O profiles. Put another way in at least one embodiment, the techniques of the present disclosure provide for not mixing different classes of data within the same defined segment or partition of storage upon which GC processing can be performed. In this manner in at least one embodiment, GC processing can be performed using defined segments or partitions of BE non-volatile storage of an LSS where the segments or partitions can include data of only a single class or type with a single corresponding I/O profile.

To further illustrate for example, assume a PLB includes intermixed data from two classes or types, where data of a first class is constantly being overwritten, and data of the second class is never or infrequently overwritten. In this case, the portions of the PLB storing the first class of data can be constantly invalidated and freed for reuse while the remaining portions of the PLB storing the second class of data remain with valid content. If GC is performed on multiple such PLBs each having the two classes of data, GC now needs to combine valid content from those PLBs to generate one or more free PLBs. By mixing the two classes of data, GC processing can perform additional data copying or movement of the valid content of the second class that can result in added write amplification. In contrast, if the PLBs processed by GC only include the first class of data, there can be less data copying and data movement, and thus less write amplification, in order for GC to generate a free PLB. Based on tests performed by the inventors, GC processing can be improved in at least one embodiment in accordance with the techniques of the present disclosure by separating incoming write data or content written to such PLBs into different streams, types, classes, or I/O profiles, and then providing for performing GC on PLBs of a single class, type or I/O profile. Based on testing performed by the inventors, the foregoing results in decreased write amplification in contrast to performing GC processing on PLBs including multiple classes or types of data with different corresponding I/O profiles.

In at least one embodiment, a class or type of data or content written can be based on an I/O profile. The I/O profile can include information characterizing the corresponding class or type of data. The information of the I/O profile can be obtained in any suitable manner. For example, the information of the I/O profile can be obtained as a result of previously provided information, such as by a user or client. Information of the I/O profile can include previously obtained information which is collected as data or content is written by one or more applications. The collected information can be based, for example, on one or more heuristics characterizing observed I/O patterns and other characteristics.

In at least one embodiment, a volume, logical device or other storage entity can be tagged by a user or client based on the one or more applications that use the storage entity and/or the particular usage of the storage entity. For example, a volume can be tagged for use by an application known to sequentially read and/or write data. As such based on the particular application, an I/O profile can be derived that characterizes the data or content of the volume as sequential read and/or sequential write, or as read heavy (e.g., more than 50% of I/Os directed to the volume are reads and less than 50% of the I/Os to the volume are writes) or write heavy (e.g., more than 50% of I/Os directed to the volume are writes and less than 50% of the I/Os to the volume are reads). Furthermore, the particular application can be known for issuing read I/Os and/or write I/Os of particular sizes that can be characterized as small (e.g., below a specified threshold size) or large (e.g., above a specified threshold size). In this manner, the I/O profile of the volume used by the application can further describe the class of data of the volume as large or small sequential read I/Os, and large or small sequential write I/Os. In at least one embodiment, the foregoing information of the I/O profile for the class of data of the volume can also be specified or provided by a user rather than through the particular application provided by the user. For example, the user can explicitly indicate the I/O pattern as read heavy or write heavy rather than indirectly derive the characteristic of read or write heavy based on the particular application.

In at least one embodiment, the I/O profile characterizing the class of data or content of the volume or other storage entity can be collected based on observations of an incoming I/O stream and/or based on one or more heuristics. For example, the incoming I/O stream to a volume can be observed and analyzed to determine whether the I/Os received at the storage system i) are mostly reads (e.g., read heavy) or writes (e.g., write heavy), ii) have large or small data payloads, and/or iii) are sequential or random with respect to the volume's logical address space. The incoming I/O stream can be observed and analyzed based on spatial and/or temporal locality with respect to the volume or storage entity's logical address space. LA1 and LA2 can denote logical addresses of the volume, where LA1 and LA2 can be target logical addresses of I/O operations directed to the volume when observing the I/O stream of the volume. Spatial locality can refer to the relative spatial closeness of LA1 and LA2 where LA1 and LA2 can be characterized as having spatial locality of reference if LA1 and LA2 are within a specified contiguous logical address window or subrange of the volume's logical address range.

Temporal locality can refer to the relative closeness of LA1 and LA2 in terms of the window of time during which corresponding I/O operations are received. For example, LA1 and LA2 can be characterized as having temporal locality of reference if both LA1 and LA2 are referenced by I/O operations withing a specified window or period of time. For example, executed a code loop can result in reference data stored at a set of logical addresses of the volume that have temporal locality in that all logical addresses are referenced within a specified period of time while executing the code loop, and where such addresses of the set may not have spatial locality of reference (e.g., the referenced data can have corresponding logical addresses that are at various ends of the logical address range of the volume and not within a specified smaller contiguous subrange or portion of the volumes logical address range). On the other hand, the set of logical addresses can also have spatial locality, for example, if they all fall within a small logical address subrange. Put another way, temporal locality refers to the reuse of specific data and/or resources within a relatively small time duration. Spatial locality refers to the use of data elements within relatively close storage locations. Sequential locality, a special case of spatial locality, occurs when data elements are arranged and accessed linearly, such as traversing the elements in a one-dimensional array. With temporal locality, if at one point a particular logical address is referenced, then it is likely that the same location will be referenced again in the near future (e.g. within a specified time period). Temporal locality can be a special case of spatial locality when the prospective location is identical to the present location. With spatial locality, if a particular storage location or logical address is referenced at a particular time, then it is likely that nearby locations or logical addresses (e.g., within a specified logical address subrange or window) will be referenced in the near future (e.g., within a specified time period).

In at least one embodiment, data or content of logical addresses having temporal locality of reference with respect to write I/O operations can be characterized as frequently overwritten. In contrast, data or content of logical addresses not having temporal locality of reference with respect to write I/O operation can be characterized as infrequently overwritten.

The I/O profile characterizing the class or type of data, such as with respect to a volume or other storage entity, can also be based on one or more heuristics related to one or more of: data compression, data compressibility, data deduplication, and data deduplicability. In at least one embodiment, a data compression heuristic of the I/O profile can be a data compression ratio for data of the type or class described by the I/O profile, where the data compression ratio can be, for example, based on prior compression of data of the type or class described by the I/O profile. In at least one embodiment, a data deduplication heuristic of the I/O profile can be a data deduplication ratio for data of the type or class described by the I/O profile, where the data deduplication ratio can be, for example, based on prior deduplication of data of the type or class described by the I/O profile.

In at least one embodiment, the techniques of the present disclosure provide for separating or classifying incoming data into multiple types or classes. Each of the classes can have an associated I/O profile. In at least one embodiment, each volume or other storage entity can have an associated I/O profile that can be used to classify incoming data directed to the volume. In this manner in at least one embodiment, the target volume or other storage entity to which data is written can be used to classify the data written into a corresponding class or type based, at least in part, on the I/O profile corresponding to the target volume or other storage entity. In at least one embodiment, multiple volumes or storage entities can have the same I/O profile when writes to such multiple volumes or storage entities exhibit the same characteristics captured in the I/O profile.

As such in at least one embodiment, during flush processing, dirty write data having the same I/O profile can be classified as belonging to the same class, where such write data of the same class can be segregated and written to a same PLB. Furthermore in at least one embodiment, when a free PLB of storage of a particular class is needed to store write data of a particular class, GC processing can be performed using only PLBs of the particular class.

Figure 9:
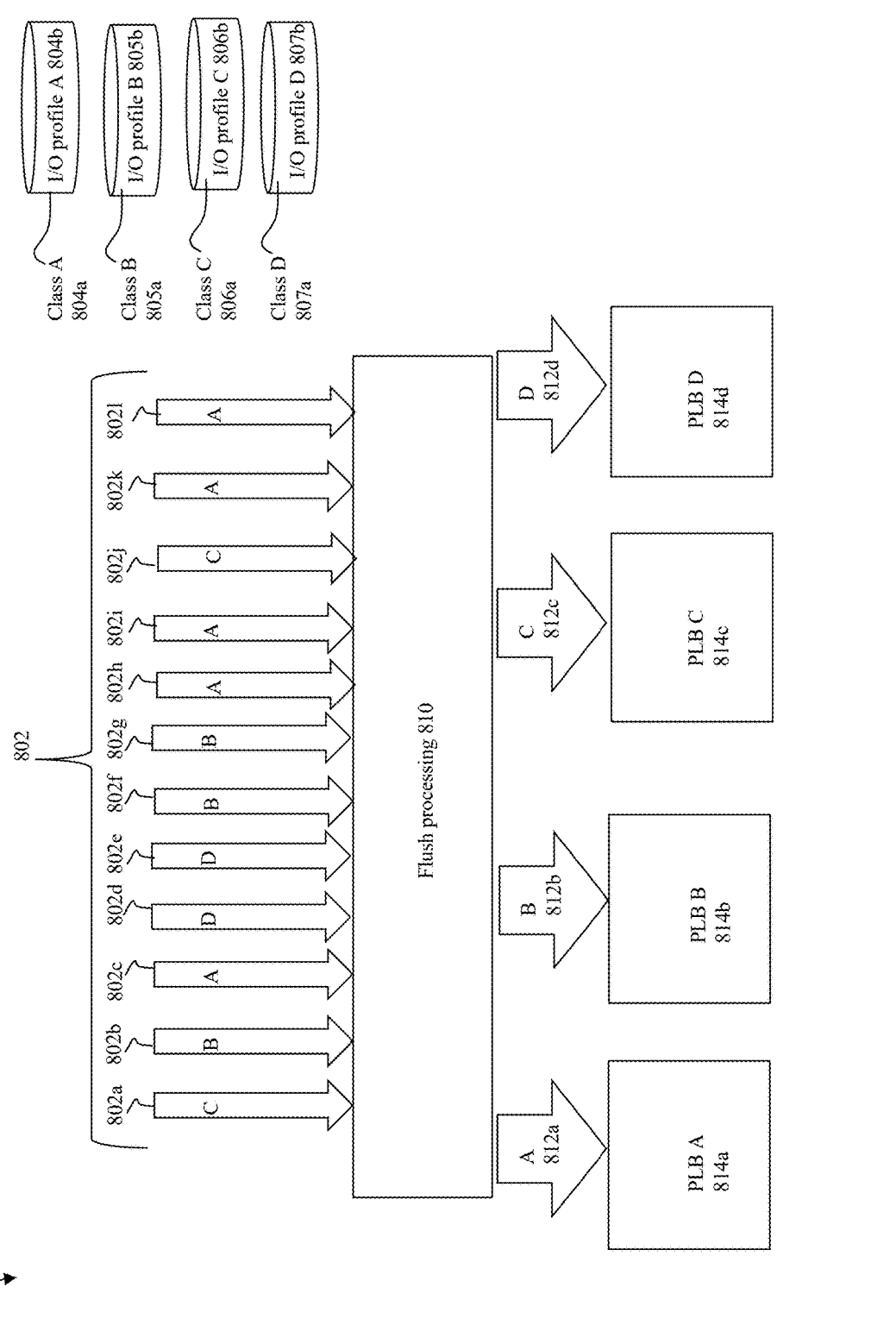
FIGS. 9 and 10 illustrate separating data of different types or classes with different I/O profiles into different streams where each class of data can be stored in a corresponding storage class in at least one embodiment in accordance with the techniques of the present disclosure.

To further illustrate, reference is made to the example 800 of FIG. 9 that illustrates classifying content or write data to be flushed, segregating or separating such write data into different classes, and then writing each class of data to a different PLB. Write data or content having the same I/O profile and thus same class can be grouped together and stored on the same PLB.

In the example 800, assume there are 4 classes or types of data, A, B, C and D. Each of the classes A-D can have a corresponding I/O profile. Each I/O profile can be associated with one or more storage entities having the same I/O profile. For example, class A 804a can be associated with a set of one or more volumes having a corresponding I/O profile A 804b, class B 805a can be associated with a set of one or more volumes having a corresponding I/O profile B 805b, class C 806a can be associated with a set of one or more volumes having a corresponding I/O profile C 806b, and class C 807a can be associated with a set of one or more volumes having a corresponding I/O profile D 807b. Based on the foregoing, a volume associated with the I/O profile A 804b can have data or content stored thereon that has the characteristics of the I/O profile A 804b, a volume associated with the I/O profile B 805b can have data or content stored thereon that has the characteristics of the I/O profile B 805b, a volume associated with the I/O profile C 806b can have data or content stored thereon that has the characteristics of the I/O profile C 806b, and a volume associated with the I/O profile D 807b can have data or content stored thereon that has the characteristics of the I/O profile D 807b.

Element 802 can include incoming I/O streams 802a-1 of different volumes where each of the incoming I/O streams 802a-l can be classified based on an associated I/O profile of the particular volume. Each of the I/O streams 802a-1 can denote the stream of content written to a particular volume or storage entity. For example, I/O stream 802a can denote data written to volume 1 having I/O profile C 806b, I/O stream 802b can denote data written to volume 2 having I/O profile B 805b, I/O stream 802c can denote data written to volume 3 having I/O profile A 804b, I/O stream 802d can denote data written to volume 4 having I/O profile D 807b, I/O stream 802e can denote data written to volume 5 having I/O profile D 807b, I/O stream 802f can denote data written to volume 6 having I/O profile B 805b, I/O stream 802g can denote data written to volume 7 having I/O profile B 805b, I/O stream 802h can denote data written to volume 8 having I/O profile A 804b, I/O stream 802i can denote data written to volume 9 having I/O profile A 804b, I/O stream 802j can denote data written to volume 10 having I/O profile C 806b, I/O stream 802k can denote data written to volume 11 having I/O profile A 804b, and I/O stream 802l can denote data written to volume 12 having I/O profile A 804b, In at least one embodiment, the data or content written 802 can be data written by recorded write I/O operations of the log. Consistent with other discussion herein in an LSS, the log can be flushed such that entries of recorded write I/O operations are flushed from the log. Flushing an entry of a recorded write I/O of the log, where the write I/O writes content C1 to a logical address LA1, can include storing the corresponding content or data C1 at a physical address PA1 on BE non-volatile storage where LA1 is mapped to PA1. PA1 can be included in a PLB of BE non-volatile storage.

In the example 800, log entries of recorded write I/Os having corresponding logical addresses of volume 1 can be included in I/O stream 802a and classified as class or type C corresponding to I/O profile C 806b, log entries of recorded write I/Os having corresponding logical addresses of volume 2 can be included in I/O stream 802b and classified as class or type B corresponding to I/O profile B 805b, log entries of recorded write I/Os having corresponding logical addresses of volume 3 can be included in I/O stream 802c and classified as class or type A corresponding to I/O profile A 804b, log entries of recorded write I/Os having corresponding logical addresses of volume 4 can be included in I/O stream 802d and classified as class or type D corresponding to I/O profile D 807b, log entries of recorded write I/Os having corresponding logical addresses of volume 5 can be included in I/O stream 802e and classified as class or type D corresponding to I/O profile D 807b, log entries of recorded write I/Os having corresponding logical addresses of volume 6 can be included in I/O stream 802f and classified as class or type B corresponding to I/O profile B 805b, log entries of recorded write I/Os having corresponding logical addresses of volume 7 can be included in I/O stream 802g and classified as class or type B corresponding to I/O profile B 805b, log entries of recorded write I/Os having corresponding logical addresses of volume 8 can be included in I/O stream 802h and classified as class or type A corresponding to I/O profile A 804b, log entries of recorded write I/Os having corresponding logical addresses of volume 9 can be included in I/O stream 802i and classified as class or type A corresponding to I/O profile A 804b, log entries of recorded write I/Os having corresponding logical addresses of volume 10 can be included in I/O stream 802j and classified as class or type C corresponding to I/O profile C 806b, log entries of recorded write I/Os having corresponding logical addresses of volume 11 can be included in I/O stream 802k and classified as class or type A corresponding to I/O profile A 804b, and log entries of recorded write I/Os having corresponding logical addresses of volume 12 can be included in I/O stream 802l and classified as class or type A corresponding to I/O profile A 804b.

As illustrated in the example 800, the various streams 802*a*-1 can denote streams of write data or content written to corresponding volumes when corresponding recorded write I/Os are flushed from the log. Element 810 can denote flush processing that flushes the corresponding recorded write I/Os from the log. In at least one embodiment, flush processing 810 can include classifying the type or class of data written as one of the types A-D. Flush processing 810 can segregate data its writes out or destages to BE storage of the LSS into the classes A-D, where various ones of the streams 802*a*-1 of the same class or type can be grouped together and written out to the same PLB. In this example, PLB A 814*a* can store only type or class A data, PLB B 814*b* can store only type or class B data, PLB C 814*c* can store only type or class C data, and PLB D 814*d* can store only type or class D data. PLBs 814*a-d* can be included in BE non-volatile storage of the LSS where content stored thereon can be stored in a log-structured manner as discussed elsewhere herein.

In the example 800, streams 802*c*, 802*h*, 802*i*, 802*k* and 8021 *i*) are of type or class A, ii) can be segregated from other classes B-D, and iii) can be grouped together and stored (812*a*) in PLB A 814*a*. Streams 802*b*, 802*f*, 802*g* i) are of type or class B, ii) can be segregated from other classes A, C and D, and iii) can be grouped together and stored (812*b*) in PLB B 814*b*. Streams 802*a* and 802*g* i) are of type or class C, ii) can be segregated from other classes A, B and D, and iii) can be grouped together and stored (812*c*) in PLB C 814*c*. Streams 802*d-e* i) are of type or class C, ii) can be segregated from other classes A-C, and iii) can be grouped together and stored (812*d*) in PLB D 814*d*.

In at least one embodiment, the PLBs 814*a-d* can be associated with corresponding data structures that can identify the particular type or class of data stored in the PLBs. In at least one embodiment, each of the PLBs 814*a-d* can also be classified as one of the data types or classes A-D thereby denoting the particular type or class of data stored in the PLB.

When flush processing needs to store data of a particular one of the classes A-D, flush processing can obtain a PLB (e.g., free PLB or partially free PLB) of the particular class matching the class of the data to be stored.

In at least one embodiment, GC processing can be performed using PLBs of the same class or type. In this manner, GC processing can be performed in one cycle or time using PLBs of the same class A in order to generate free PLBs of class A. GC processing can be performed in another separate cycle or time using PLBs of the same class B in order to generate free PLBs of class B. GC processing can be performed in another separate cycle or time using PLBs of the same class C in order to generate free PLBs of class C. GC processing can be performed in another separate cycle or time using PLBs of the same class D in order to generate free PLBs of class D. Put another way in at least one embodiment, GC processing can use source PLBs of a single class, type or I/O profile in order to generate one or more free PLBs of the same single class, type or I/O profile.

In at least one embodiment, BE non-volatile storage can include multiple storage tiers, where each tier can have a corresponding RAID level providing data protection for the tier. In at least one embodiment, each tier can grow or shrink in terms of one or more units each of which is an uber or 64 GB. In at least one embodiment, each uber can be divided into 8 subunits or SUs, where each SU is 8 GB. In at least one embodiment, each SU can be further divided into smaller units that are PLBs.

In at least one embodiment, each SU unit of storage can be assigned a corresponding class or type indicating that all PLBs of that SU are also the same class or type. Thus, BE non-volatile storage of the LSS used for storing content or data can have classes or types assigned at the SU level of granularity. In this manner, all the PLBs of an SU can only include data or content of the same class or type having the same I/O profile.

In at least one embodiment, each uber can include SUs of different classes or types.

In at least one embodiment, an SU of a first class or type can be converted, reallocated, redistributed or reassigned to a different second class or type.

In at least one embodiment, SUs of the same class or type can be characterized as a sub LSS or sub log structured system. Each class or grouping of SUs of the same class or type of data can be assigned storage based, at least in part, on the storage needs and demands of the particular class or type. In at least one embodiment of a multi-node system, SUs of the same class can be owned by only a single node for flushing and GC purposes. Thus in at least one such embodiment, the owner of a class of SUs can be responsible for i) flushing and storing data of the class, and ii) performing GC processing and CA processing for PLBs/SUs of the class.

Figure 10:
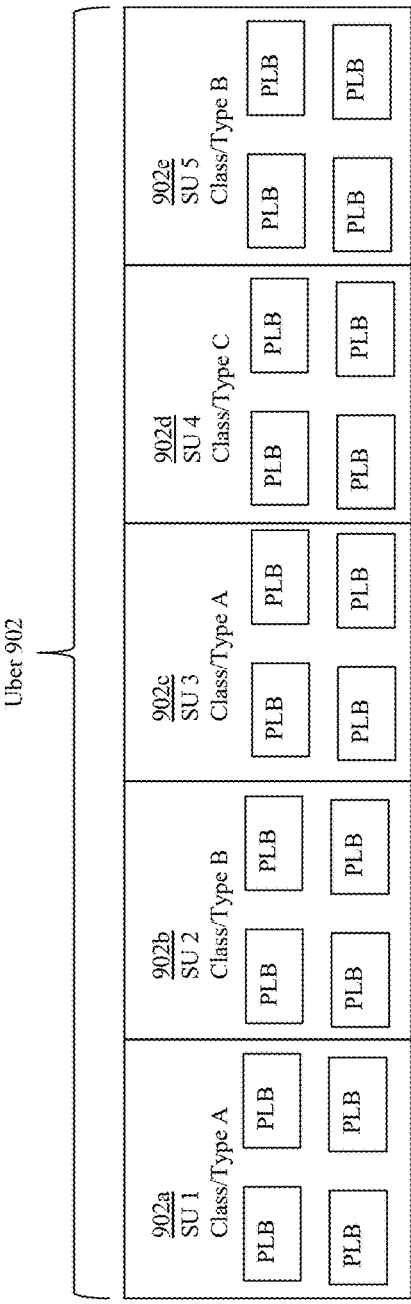

Referring to FIG. 10, shown is an example 900 illustrating an arrangement of storage of an LSS in at least one embodiment in accordance with the techniques of the present disclosure.

For simplicity, the example 900 illustrates only a single uber with only 5 SUs. However, consistent with other discussion herein, the uber 200 can actually include 8 SUs rather than the 5 SUs shown for simplicity of illustration. Also, for simplicity, the SUs are only one of 3 classes or types A-C. More generally, an embodiment can include any suitable number of classes or types corresponding to the classes or types of content or data and the various I/O profiles.

The example 900 includes the uber 200 with SUs 902*a-e*. Each of the SUs 902*a-e* can be one of the classes or types A-C. SUs 902*a* and 902*c* are class A. SUs 902*b* and 902*e* are class B. SU 902*d* is class C. For simplicity each SU is illustrated as only including 4 PLBs. More generally, each SU can include any suitable number of PLBs based on the sizes of the SU and PLB units of storage.

In at least one embodiment, the type or class of each SU can be tracked in an SU descriptor which generally includes information describing the SU. In at least one embodiment, the number of SUs in each class can be persistently recorded in a per system data structure of a boot tier.

In at least one embodiment, the utilization of PLBs can also be tracked on a per class basis for use in determining utilization of each SU in a class and also utilization of storage assigned to each class in the system. Put another way in at least one embodiment, a per PLB utilization can be tracked for all PLBs of the same particular class where such per PLB utilizations can be associated with the particular class. For the particular class, the per PLB utilizations can be used in connection with determining a per SU utilization and an overall class level utilization for the particular class in accordance with the techniques of the present disclosure. To further illustrate consider type or class A storage that includes SUs 902*a* and 902*c*. Utilization can be tracked per PLB for each of the PLBs in SU 902*a* and SU 902*c*. The per PLB utilizations for PLBs of 902*a* can be used to determine an overall average PLB utilization of all PLBs in 902*a*, where the foregoing overall average PLB utilization can denote a utilization for SU 902a. In a similar manner, a utilization can be determined for SU 902c. The SU level utilizations for 902a and 902c can be averaged to determine the utilization for class or type A storage, or for the class A sub LSS. Thus in at least one embodiment, the average per PLB utilization with respect to all PLBs of class or type A can denote the utilization for class or type A storage (e.g., across all SUs 902a, 902c of class or type A).

In at least one embodiment, the following metrics can be tracked for each storage class, type, or I/O profile, and thus for each sub LSS:

Metric a). expanded capacity: The amount of storage capacity allocated to the particular type or class. Sometimes expanded capacity can be referred to as the allocated capacity allocated for use in storing the particular type or class of data.

Metric b). utilization: The average utilization of all PLBs in the class. This denotes the amount or percentage of storage consumed with respect to the expanded capacity.

Metric c). write density (WD): The amount of data written to BE non-volatile storage per GB of the allocated or expanded capacity.

Metric d). ingest writes: The amount of data written due to flushing. This can denote the amount of user or client data written, such as by host or client write I/Os.

Metric e). Write amplification or WA: The factor of additional GC writes to BE non-volatile storage in comparison to flush writes.

It should be noted that equations and further detail regarding WA and WD are provided in following paragraphs.

In at least one embodiment, the metric c, WD, determined for a class "x" can based on the amount of user data written (e.g., write data flushed from the log) and also based on the amount of data moved or copied in connection with GC processing for the particular class "x".

In at least one embodiment, GC processing needs to have prior knowledge of the type, class or I/O profile of the data being written to the PLBs so GC processing can determine the PLBs to combine or the partial PLBs to give to flush for CA for the incoming stream of data.

In at least one embodiment when GC processing is performed, GC processing will only garbage collect or combine content from PLBs within the same class of SUs, thereby avoiding intermixing different types or classes of data. Based on the class, type or I/O profile of the written data, a PLB (e.g., free or partially free) belonging to a particular class of storage can be provided to flush processing for storing the written data.

In at least one embodiment, GC processing can be performed for each class independently so that GC processing to generate a free segment or portion of storage, such as a free SU, of a single class only uses or only operates on storage of the single class.

Referring to FIG. 11, shown is a flowchart 950 of processing that can be performed in at least one embodiment in accordance with the techniques of the present disclosure. FIG. 11 summarizes processing described above.

At the step 952, the storage system receives multiple writes directed to one or more volumes, or more generally, storage objects having content stored on the storage system. The writes can be received from one or more hosts, or more generally, storage clients. The storage system can implement an LSS that uses a persistent log for recording writes and possibly other operations. The LSS can store content written by write operations persistently on BE non-volatile storage including one or more types of non-volatile SSDs. The non-volatile SSDs can include, for example, any of the following types of non-volatile SSDs: SLC, MLC, TLC and/or QLC drives. From the step 952, control proceeds to the step 954.

At the step 954, as the writes are received, each write is recorded in a log. Once a write has been recorded in the log, an acknowledgment regarding completion of the write can be sent to the respective host or storage client that sent the write. In at least one embodiment, the log can be a persistent log stored on non-volatile storage. An entry can be created in the log for each recorded write. The entry can generally include information describing the write operation. For a write that writes content C1 to a target logical address LA1 of a volume V1, an entry E1 can be recorded in the log where the entry E1 can include: the target logical address LA1, and the content C1 written to LA1. From the step 954, control proceeds to the step 956.

At the step 956, at some point in time subsequent to recording entries for the writes in the log, the entries denoting the recorded writes can be flushed from the log. Flushing an entry such as E1 from the log can include persistently storing the respective content C1 of LA1 persistently on a non-volatile SSD of the BE non-volatile storage.

In the step 956, flushing can include segregating write data by class, type or I/O profile. Flushing can include grouping together write data or content of the same class, type or I/O profile. From the step 956, control proceeds to the step 958.

At the step 958, for write data of a particular class, type or I/O profile, a free PLB of storage can be obtained from an SU having a matching class or type. The write data or content of the particular class can be accumulated in a buffer the size of a PLB. The buffer of write data can then be written out to the free PLB of the particular class. In at least one embodiment, the PLB of storage can alternatively be a partially free PLB so that the amount of data written to the partially free PLB can at most be equal to the amount of free storage on the partially free PLB.

In at least one embodiment, as the write I/O workloads from different host applications change over time, the corresponding utilizations of the classes can also change overtime as all the classes don't have the same amount of data written. Put another way, as the write workload for writing a particular type or class of data (having a corresponding I/O profile) changes of over time, so does the amount of non-volatile BE storage of the particular type or class which is consumed for storing the data or content written. Thus, the demand for BE non-volatile storage of each class can vary, at least in part, with the write I/O workload of each class, type or I/O profile.

In at least one embodiment, when a class needs more storage, one or more additional SUs can be allocated and added to the class such as by allocating any currently unassigned or unallocated storage capacity (expandable capacity) in the system to the class. If more expandable capacity is not available for allocation to the class since the amount of storage is finite, the expandable capacities of storage allocated to the classes can be rebalanced. In at least one embodiment, such rebalancing can include reallocating a portion of unused or free storage from one class to another class. If a volume or snapshot is deleted thereby resulting in freeing storage capacity of a particular class, the freed storage capacity can be reallocated or rebalanced among other classes, or generally, one or more classes, based on the particular need of each class. In at least one embodiment, the metrics maintained for the classes or types of storage can be used in connection with determining how to rebalance or redistribute storage capacity between the classes, and/or when to perform GC processing.

In at least one embodiment, rebalancing can include:

1) Determining the one or more classes target classes to receive or be allocated additional storage capacity. In at least one embodiment, each of the target classes can be determined to have a need or demand for additional storage capacity.

2) Based on the policy and utilization of different classes, determining which class can release or donate a portion of its allocated but unconsumed storage capacity. The class that can release storage capacity can also be referred to as a source or donor class.

3) Garbage collecting the SUs within the source or donor class to create an empty free SU.

4) Changing the assignment of the free SU from the source class to the class or type of a target class. In at least one embodiment, the target class can be one of the target classes previously determined, for example, to have a need or demand for additional storage capacity.

As a simple example in at least one embodiment, reference is made back to FIG. 10. In at least one embodiment, storage can be allocated or assigned to a particular class in SU units. In at least one embodiment each SU of available unallocated or unassigned storage can be allocated or assigned to a class as needed such as, for example, as data or content of the various classes is written. Over time all the available system storage capacity can be allocated or assigned to the various classes. Assume a simple example with storage classes A-C and that all available system storage has been allocated or assigned to the classes A-C. However, not all storage allocated to the classes may be utilized, for example, due to overwriting content of logical addresses such that the old overwritten data becomes invalid or stale. As a result, assume that class A storage is 50% utilized, class B storage is 60% utilized, and class C storage is 100% utilized. Now additional storage capacity is needed for class C storage, for example, in order to flush class C write data to a class C PLB. However, there is no free class C storage. As a result, processing can be performed to obtain a free SU of storage from a source or donor class and reallocate the free SU of storage to the target class C.

In at least one embodiment, the policy can specify to select the storage class with the lowest utilization as the donor or source class. In this example, class A has the lowest utilization of 50% such that class A is the source or donor class in this example. Processing can be performed to garbage collect SUs of class A to create an empty or free SU, where the empty or free SU can have its class or type changed from class A to class C.

Figure 12:
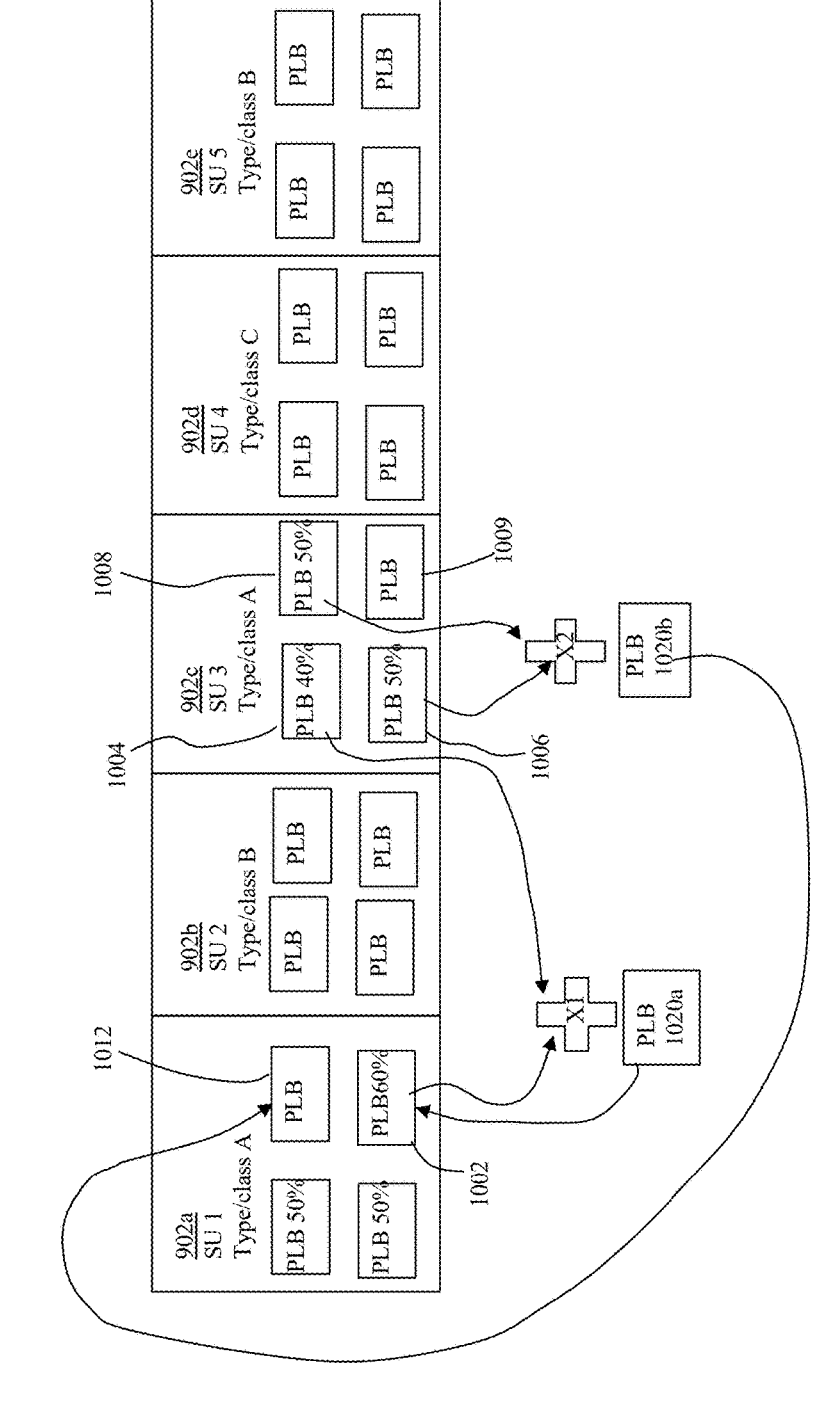

The foregoing redistribution, reallocation or reassignment of storage capacity from class A to class C will now be described in more detail with reference to the example 1000 of FIG. 12.

The example 1000 includes the uber and SUs of FIG. 10 further annotated with details regarding the redistribution, relocation or reassignment of an SU from class A to class C. SUs 902a and 902c are included in type or class A storage, the source class, from which an SU of storage is to be reallocated to the target type or class C (e.g., due to the demand or need by storage class C).

In this example 1000, SU1 902a has PLB 1002 at 60% utilization, a single free PLB 1012 (e.g., utilization=0%), and the remaining 2 PLBs each at 50% utilization. SU 902c includes the following PLBs and corresponding utilizations: PLB 1004=40%, PLB 1006=50%, PLB 1008=50%, and PLB 1009=0% (e.g., free PLB).

In at least one embodiment, GC processing can be performed to free SU3 902c of class A storage by:

i) Garbage collecting or combining PLB 1002 (60% utilization) with PLB 1004 (40%) utilization, where valid content from PLBs 1002 and 1004 can be combined (as denoted by 1020a and X1), copied and stored in the single PLB 1002 (where PLB 1002 now has 100% utilization after GC processing); and ii) Garbage collecting or combining PLB 1006 (50% utilization) with PLB 1008 (50% utilization), where valid content from PLBs 1006 and 1008 can be combined (as denoted by 1020b and X2), copied and stored in the single PLB 1012 (where PLB 1012 now has 100% utilization after GC processing).

As a result of the foregoing, all PLBs of SU3 902c are now free. Subsequently, after SU3 902c has all free PLBs, SU3 902c can have its class or type changed or converted from class/type A to class/type C, thereby indicating that SU3 902c is now used for storing only data of class or type C corresponding to I/O profile C. As illustrated in the example of FIG. 12, GC processing to generate a free SU of contiguous class A storage can include moving valid data or content between PLBs of different SUs of the same class A. GC processing to generate a free SU of contiguous class A storage can include moving valid data or content between PLBs of the same SU of the same class A.

If a free PLB is now needed by flush to store data of class or type C (having a corresponding I/O profile C), then the free PLB of class C can now be provided from SU3 902c after the foregoing GC processing is performed and SU3 902c has its type or class changed from A to C.

Figure 13:
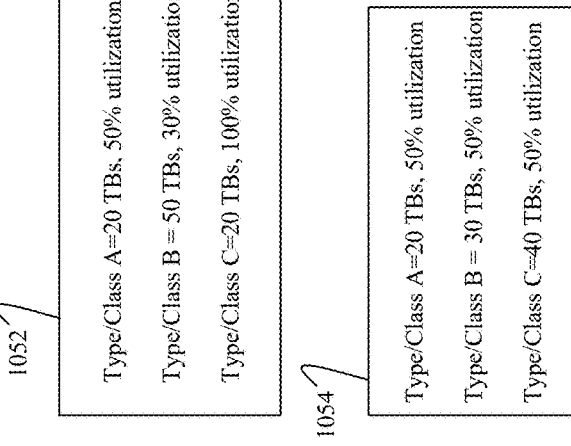

As another example with reference to the example 1050 of FIG. 13, assume that there are only 3 classes of storage, classes A, B and C as noted above.

In at least one embodiment, the policy can also indicate to maintain all storage classes at the same or approximately the same utilization (e.g., within a specified range or tolerance of acceptable difference) whereby such utilizations of all storage classes can be characterized as balanced. For example, the policy can indicate that each of the storage classes A-C should maintain a corresponding utilization within a specified target utilization range, whereby if all storage class level utilizations fall within the foregoing range, then the class level utilizations can be characterized as balanced. Alternatively, if not all storage class level utilizations fall within the foregoing range, the class level utilizations can be characterized as unbalanced or imbalanced. In at least one embodiment, the foregoing range can be based, at least in part, on the average utilization across the storage classes and some acceptable window or range of difference. In at least one embodiment, the acceptable window or range of difference can be an amount X+/−the average, where X can be based on a number of acceptable standard deviations from the average. In at least one embodiment, if one or more of the class level utilizations do not fall within the acceptable range, processing can be performed to redistribute or rebalance unused but allocated storage capacity between the classes in efforts to reduce or remove the detected imbalance and in efforts to achieve or work toward obtaining balanced utilizations of the storage classes. In at least one embodiment, if an imbalance is determined with respect to the storage class utilizations, the rebalancing or redistributing can be performed, such as a background process, in efforts to achieve a state of balanced storage class utilizations and reduce or eliminate the detected imbalance.

At a first point in time T1, element 1052 can denote the allocated or expanded storage capacities and utilizations of the classes A, B and C. At time T1, i) class A has an expanded or allocated capacity of 20 TBs with 50% utilization such that 10 TBs of the allocated Class A capacity is unused or does not contain valid content or data and 10 TBs of the allocated class A capacity stores valid data or content; ii) class B has an expanded or allocated capacity of 50 TBs with 40% utilization such that 15 TBs of the allocated class B capacity stores valid data or content and 35 TBs of the allocated Class A capacity is unused or does not contain valid content or data; and iii) class C has an expanded or allocated capacity of 20 TBs that is 100% utilized such that all 20 TBs of class storage stores valid data or content. Assume for the example 1050 that 90 TBs denotes the total system storage capacity so that all 90 TBs has been allocated to the classes A-C as illustrated by 1052.

In at least one embodiment, GC processing can be performed to redistribute unused storage capacity that is allocated to a class but is also free or not utilized in storing valid data. In at least one embodiment, such redistribution and GC processing can be triggered during flush processing when flush processing needs additional storage capacity for storing class C data in type C storage. In at least one embodiment, such redistribution and GC processing can be triggered by the occurrence of one or more conditions that can be included in a specified policy. In at least one embodiment, such redistribution and GC processing can be triggered due to the class C utilization being above a maximum utilization threshold specified in the policy. In at least embodiment, the policy can specify to redistribute capacity from a source class to the class C based, at least in part, due to class C's utilization being 100% thereby indicating that class C has no free or available storage capacity for storing new data. As another example in at least one embodiment, the policy can specify to redistribute capacity from a source class to class C due to a detected imbalance in the utilizations of the classes A-C. For example, the policy can specify all storage class level utilizations should be within a specified target range, such as 40-60%. As another example, the policy can specify that all storage class level utilizations should be within a specified wind or range with respect to the average class level utilization. In this case with reference to FIG. 12 element 1052, the average class level utilization is 60% and the policy can specify that all class level utilization should fall within a window of +/−X %, such as 10%, of the average 60% (e.g., all fall within the range of 50-70%). In this example, the current utilizations at time T1 denoted by 1052 can fail to meet any of the foregoing policy conditions or criteria. As a result, redistribution and GC processing can be performed.

In at least one embodiment, redistribution and GC processing can determine that class C is a target class to receive additional allocated or expanded capacity from one or more other source classes (e.g., class A and/or B). In at least one embodiment, class C can be determined as the target class based, at least in part, on the particular condition or criterion that is violated and therefore triggered the redistribution and GC processing. For example as noted above, class C's utilization can violate a specified condition or criterion of the policy by exceeding an allowable maximum utilization. As another example, a policy condition or criterion can be violated where one or more class level utilizations do not fall within the specified target range. In this case, class C's utilization of 100% may not fall within the specified target range. Although there can be more than one class having a corresponding utilization not falling within the target range, class C can be selected as the target class to be allocated or assigned additional storage capacity since class C has the highest current utilization of 100% at time T1.

In at least one embodiment, the policy can further specify one or more additional criteria or conditions for selecting a source class. In at least one embodiment, the source class can be selected as the particular class having the lowest class level utilization. In the example 1050, class B at time T1 has the lowest class level utilization of 30%. Additionally in at least one embodiment, the policy can also specify that the source class have a class level utilization that does not exceed a specified maximum. In this example 1050, assume that class B is selected as the source or donor class based, at least in part, on its class level utilization of 30% meeting any one or more specified criteria or conditions needed to qualify as a source class. For simplification of illustration, assume that GC processing results in a 20 TB segment or chunk of storage from class A that is reallocated or reassigned from class A to class C. In this example, assume that the 20 TB segment denotes the size of a storage unit that can be reallocated between classes. As a result, the allocated or expanded storage capacities and class level utilizations at time T2 after the foregoing reallocation of 20 TB of storage capacity from class B to class C can be as denoted by element 1054. In particular at time T2 as denoted by element 1054, Class A's expanded or allocated capacity and utilization can remain as at time T1 as expressed by element 1052. At time T2 as denoted by element 1054, class B's expanded or allocated capacity has decreased 20 TBs from 50 TB (at time T1) to now 30 TBs with a utilization of 50%. At time T2 as denoted by element 1054, class C's capacity has increased from 20 TBs to 40 TBs with a utilization of 50%.

As a result of the foregoing redistribution, reallocation or reassignment of storage capacity from class B to class C, the class level utilizations can meet one or more specified balancing criteria of the policy. For example, the above-noted conditions of having all class level utilizations within a specified target range can denote a balancing criterion that was violated due to a detected class level utilization imbalance among the classes. In at least one embodiment, the balancing criterion can be used in connection with selecting the source and target classes with respect to the redistribution and where GC processing is performed on the source class to obtain a contiguous free segment or chunk of storage to be reallocated from the source class to the target class. In this example at time T2 as denoted by 1054, all class level utilizations are 50% thereby denoting balanced class level utilizations all failing within a specified target range of the balancing criterion of the policy.

As a variation to the foregoing, processing can be performed more generally to maintain class level utilizations to meet expected or predicted demands of the various classes. The foregoing examples assume that the demands or write I/O workloads of the various classes A-C may be approximately the same as reflected by balancing criterion that all class level utilizations fall within the same target range. As a variation, it may be that first one or more of the classes has a higher relative write workloads that one or more other classes. As a result, redistribution, reallocation or reassignment of storage capacity between classes can be based on suitable target class level utilizations that can vary among the classes depending on the particular write I/O workload of the classes. For example, based on any of one or more heuristics, historical data gathered over a period of time, and the like, it can be expected that class C has an increase in write I/O workload at particular time periods, such as at particular times of a day, particular days of the week, particular months of the year, and the like. As a result, the foregoing redistribution and GC processing can be performed to maintain class C storage with a sufficiently low level of utilization to meet any expected increased demands during such time periods of expected increased write I/O workload.

In at least one embodiment, the techniques of the present disclosure can be adapted and used in connection with new drive technologies such as, for example, Flexible Data Placement or FDP. In at least one embodiment, FDP can be included in a standard or protocol such as NVMe or Non-volatile Memory Express. In at least one embodiment, FDP can be supported by one or more drives or storage devices as a way to optimize drive operation by taking placement directive or commands, such as from a storage system. Using FDP in at least one embodiment in accordance with the techniques of the present disclosure, the storage system can manage the user data stored on drives or storage devices, such as SSDs providing BE non-volatile storage to capitalize on a lower write amplification factor by an SSD to extend the SSD life, improve performance, and lower latency. In at least one embodiment, FDP can be used to avoid having the SSD, or more generally drive, perform any GC by having the storage system always write to a new reclaim unit, and then deallocating any old or prior reclaim units. In at least one embodiment, each reclaim unit can be a group of one or more erase blocks.

In at least one embodiment, FDP can be used with the techniques of the present disclosure to segregate data as discussed herein based on classes such that each reclaim unit can include only data of a single class or type characterized by a single I/O profile. In this manner, the techniques of the present disclosure can use FDP to request that the drive store data of the same class in the same reclaim unit.

In at least one embodiment, FDP uses reclaim units each describing a physical portion of the SSD into which the storage system can direct the SSD to store or place data.

In at least one embodiment, an uber of SSD storage can correspond to an entire reclaim unit where the entire uber of storage can be assigned the same class or type of storage for storing data. In this manner, the level of granularity for allocation and distribution to a particular class or type of storage used for storing only data of the particular class or type can be the uber, rather than the SU such as described, for example, in connection with the example of FIG. 12. If storage capacity needs to be rebalanced or reallocated between different classes or types of storage that store data of the corresponding class or type, then an uber assigned to a particular class can be emptied, trimmed or deallocated, and then reallocated and assigned to the new class.

An example using FDP with the techniques of the present disclosure is described below with reference to the example 1100 of FIG. 13.

In the example 1100, assume that ubers 1102, 1104 and 1106 each correspond to a reclaim unit of storage of a drive such as an SSD. Element 1103 denotes the state of ubers 1102, 1104 and 1106 at a first point in time T11 where ubers 1102 and 1106 are used for storing only class or type A data, and uber 1104 is used for storing only class or type B data. Assume that processing has determined to redistribute or reallocate an uber of storage from class or type A to class or type B. As described below in at least one embodiment, i) valid class A content can be moved from uber 0 1102 to another new uber, ii) uber 1102 can be trimmed or deallocated, and then iii) uber 1102 can be reallocated and assigned to class or type B.

In a first step S1 as denoted by element 1101a, processing can be performed to allocate a new uber X 1108. In at least one embodiment, the new uber X can be the size of a single reclaim unit denoting a group of one or more erase blocks. The new uber X can be mapped to a corresponding portion of physical storage of the SSD where the physical storage corresponds to the one or more erase blocks. The new uber X can be characterized as clean with no existing valid data or content such that uber X has 100% of its capacity free and available (e.g., uber X has no utilization). In at least one embodiment, allocating the new uber X 1108 can be performed by issuing a corresponding command to the SSD. Following the step S1, the step S2 can be performed.

In the step S2 as denoted by element 1101b, the two source ubers, uber 0 1102 and uber 2 1106, can both store valid content of the same data class such as type A. Valid data or content from the two source ubers 1102, 1106 can be combined and stored or written to new uber X 1108. Thus uber X 1008 can be characterized as a target uber with respect to the movement of valid content from the two source ubers 0 (1102) and 2 (1106). In at least one embodiment, the combined data or content can be stored in the new uber X by issuing write commands to the SSD to store the combined content in the new uber X. The two source ubers can also similarly each correspond to a reclaim unit such that each of the two source ubers is also mapped to a corresponding portion of physical storage of the SSD.

As a result of the above step S2, the two source ubers 0 and 2 (1102, 1106) can be reused for storing new content. Uber X can be tagged as storing only class or type A content.

The element 1101b illustrates the uber X 1108 as a result of combining and storing valid content from source ubers 1102 and 1106. In at least one embodiment, i) the valid data from PLBs 1102a and 1106a can be combined and stored in PLB 1108a with a resulting utilization of 100%, ii) the valid data from PLBs 1102b and 1106b can be combined and stored in PLB 1108b with a resulting utilization of 100%, iii) the valid data from PLBs 1102c and 1106c can be combined and stored in PLB 1108c with a resulting utilization of 100%, and the valid data from PLBs 1102d and 1106d can be combined and stored in PLB 1108d with a resulting utilization of 90%. Following the step S2 the step S3 can be performed.

In the step S3 as denoted by element 1101c, the storage system can deallocate the two reclaim units corresponding to ubers 0 and 2 (1102, 1106) whereby the SSD deallocates corresponding physical storage for the two reclaim units and omits performing GC processing on these two reclaim units. In at least one embodiment, the storage system can deallocate each of the two reclaim units by issuing a corresponding command, such as a deallocate or trim command, to the SSD. In at least one embodiment, such deallocation of the source ubers 1102, 1106 can unmap corresponding physical storage from the two reclaim units corresponding to ubers 1102, 1106. Following the step S3, the step S4 can be performed.

In the step S4, the ubers 1102 and 1106 can be reallocated and each assigned to a new class or type. In this example 1101c, uber 1102 is illustrated as being reallocated and then assigned class or type B for storing class or type B data. Reallocating an uber, such as uber 1102, can include remapping the uber to a reclaim unit of physical storage of the SSD. As can be seen in 1101c, uber 1102 does not store any valid class B content yet whereby all PLBs 1102a-d of uber 1102 have 0% utilization. Although not illustrated, uber 1106 can also be similarly reallocated and assigned to a class or type as needed. In at least one embodiment, the storage system can reallocate uber 1102 and thus the reclaim unit of uber 1102 by issuing a corresponding command to the SSD.

The storage system can then assign the uber 1102 to the class B. In at least one embodiment, a descriptor can be associated with each uber in manner similar to the SU descriptor so that the descriptor for uber 1102 can indicates that it is used for storing class or type B data. In a similar manner, a descriptor can be associated with each of the other ubers 1104, 1106 and 1108 when allocated and can identify a corresponding class or type assigned to the uber.

Consistent with discussion herein in at least one embodiment, a reclaim unit can be a portion of SSD storage where the storage system can manage what content is written to the reclaim unit.

In at least one embodiment, the deallocate or trim command noted above can be issued to the SSD whereby the SSD does not perform internal GC processing on the particular reclaim unit or uber deallocated. In at least one embodiment, the SSD does not perform GC processing on deallocated reclaim units. Deallocating a reclaim unit indicates that the reclaim unit includes no valid content (e.g. only includes invalid content or stale data). As such, there is no need for the SSD to perform GC processing to move any valid content from the reclaim unit prior to reallocating or reusing the deallocated or trimmed reclaim unit.

In this manner, the storage system can issue a trim or deallocate command to the SSD with respect to a reclaim unit. The trim or deallocate command indicates to the SSD controller that the reclaim unit does not contain any valid content (e.g., only includes invalid content). In this manner, the storage system handles any needed movement or copying of valid content from the reclaim unit prior to issuing the trim or deallocate command to the SSD.

In response to the trim or deallocate command for a specified reclaim unit, the SSD can mark the reclaim unit as one that does not include any valid content and does not require any GC processing. Put another way, there is no need for the SSD to perform GC processing to move any valid content from the deallocated or trimmed reclaim unit prior to reallocating or reusing the deallocated or trimmed reclaim unit. Thus, the SSD can erase a trimmed reclaim unit and then reuse or rewrite to the trimmed reclaim unit without performing GC processing since the reclaim unit contains no valid content. In at least one embodiment, issuing a deallocate or trim command for an uber removes or unmaps physical storage associated with the uber from usable storage capacity that can be used for I/Os.

In the step S4 as noted above, subsequently, the two reclaim units 1102, 1106 that were deallocated can now be reallocated or reused for storing new valid content or data. For example, uber 0 1102 can correspond to a first of the two deallocated reclaim units and can be reallocated and assigned a new corresponding class by the storage system. For example, the storage can now use uber 0 1102 to store content of a different class such as type or class B. In at least one embodiment, reallocating uber 0 1102 can include mapping uber 1102 corresponding to a reclaim unit to a corresponding physical storage of the SSD.

Figure 14:
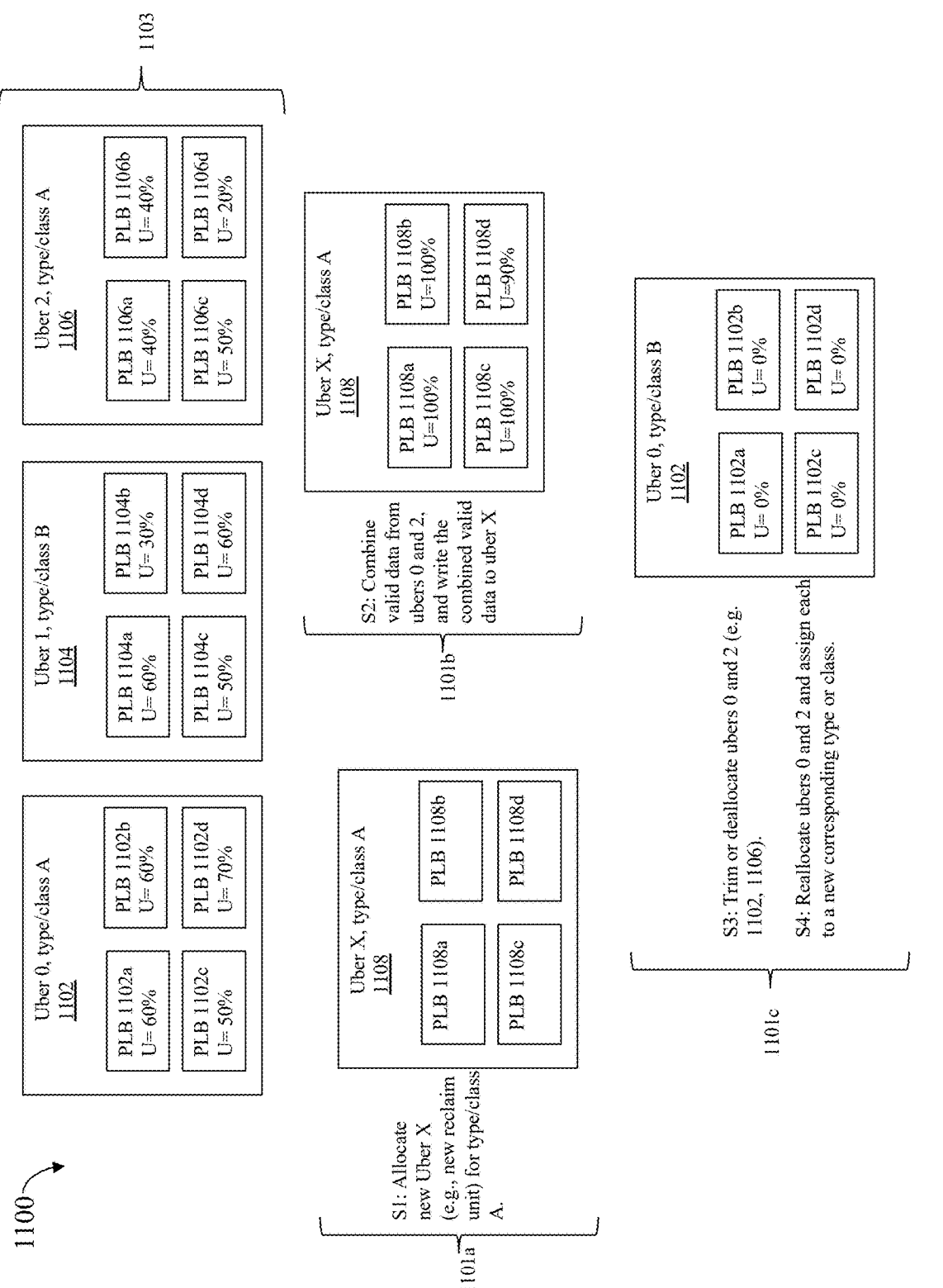

Thus in at least one embodiment in connection with the foregoing as illustrated in FIG. 14, the storage system can perform any needed GC processing, such as in connection with moving valid content in step S2 above and instruct or notify the SSD not to perform internal GC processing through the use of the trim or deallocate command in S3 above. As a result in at least one embodiment, GC processing within the SSD can be avoided by having the storage system perform any needed GC processing that includes: i) writing valid content from one or more source reclaim units or ubers (e.g., ubers 0 and 2 1102, 1006 in the above example) to a new free target reclaim unit corresponding to uber X 1108; and then ii) deallocating the one or more source reclaim units or ubers, such as ubers 0 and 2 (1102, 1006). The ubers 1102, 1106 corresponding to the deallocated reclaim units can be reused for storing new content without the SSD performing its own internal GC processing. For example, as illustrated in 1101c, uber 0 1102 can be converted from class A to class B such that valid content classified as class B now be stored on uber 0 1102. The foregoing conversion of an uber such as uber 0 1102 from type or class a to a new class or type B can be performed as needed to allocate new storage for use with storage class or type B. More generally, the foregoing conversion can be performed to free an uber of storage of a first class (e.g., type A) and convert the free uber of storage to a second different class (e.g., type B) in accordance with the techniques of the present disclosure. For example, the foregoing can be performed in connection with rebalancing storage capacity among the various classes or types data. For example, the foregoing can be performed in connection with increasing the amount of storage capacity of type B and decreasing the amount of storage capacity of type A.

In at least one embodiment where each uber corresponds to a reclaim unit of one or more erase blocks, each class or type or storage for storing a corresponding class or type of data can include a group of one or more ubers each assigned the corresponding class or type. The techniques of the present disclosure can be used to operate, such as for GC reclaiming, rebalancing or redistributing, upon units of storage that are ubers rather than SUs as the basic unit for allocating and distributing among the classes or types. In the embodiment of FIG. 14, each uber can be characterized as homogeneous including only one class or type of data whereby all SUs and all PLBs of the uber store only the one class or type of data. In contrast in the embodiment of FIG. 12, each uber can include multiple SUs, where each SU can store a different class or type of data.

In FIG. 14, storage is reclaimed in uber units such as reclaiming storage of ubers 1102, 1106 through the above-noted deallocating and reallocating. In FIG. 14, it may be that only one uber 1102 is reallocated and assigned to class B in 1101c, and that uber 1106 is not yet reallocated and not yet reassigned to any class or type.

In FIG. 14, the steps S1 and S2 generally provide for the storage system performing GC processing to combine and move valid data from multiple source ubers 1102, 1106 to a single target uber 1108. With FDP in at least one embodiment such as in FIG. 14, valid data can be combined from source ubers 1102, 1106 and written to a new or clean location, uber 1108 (e.g., that has 0% utilization).

In at least one embodiment using FDP, the techniques of the present disclosure can be utilized in manner that performs any needed GC processing at the storage system level and avoids or omits performing any GC processing internally within the SSD at the drive level by issuing the above-noted trim or deallocate command. The foregoing can result in a decrease in WA and SSD drive wear.

What will now be described are techniques of the present disclosure that can be used in connection with modulating GC processing costs of each class so that the over system GC processing costs can be reduced.

In at least one embodiment, GC processing can determine the density of packing of written data, and if and when to perform GC based on heuristics. In at least one embodiment, data of a volume can be tagged by a user as having a short lifetime whereby the existing data stored at a logical address can have a high overwrite rate. In this case where a volume is tagged as having data with a short lifetime such as due to overwrites, it can be beneficial to not perform GC on such data. For example, if a class of data has frequent overwrites and a high write density, it can be beneficial not to GC such data and let it self clean whereby the data will soon become invalid or stale as a result of being overwritten. Avoiding GC in this case can reduce the amount of CPU resources consumed for GC and can also reduce WA that causes drive wear. When utilization is high, the GC of highly utilized PLBs causes significant WA as more iterations of PLB defragmentation can be needed to create an empty or free PLB. By reducing the utilization of a class which generally causes partially overwritten PLBs, the WA due to GC can also be reduced.

In at least one embodiment, it can be suboptimal to maintain all the classes at the same utilization since the write density of each of the class can be different. For example, consider two classes—A, B—in a system which have same amount of valid data stored in each class and thus the same class level utilization. Now consider 90% of the writes (e.g., a majority being over-writes) go to class A and 10% of the writes to class B. Maintaining both at the same utilization may not be optimal as class A storage can be expected to generally have a lot more data written and/or overwritten per GB of storage allocated than class B storage. If GC is performed on class A storage and then on class B storage, GC processing of class A storage would have to garbage collect more PLBs in comparison to GC processing of class B storage due to the constant overwrites, thereby increasing the WA due to GC.

In at least one embodiment, WA or write amplification due to the GC processing can be defined as in EQUATION 2 below:

$$WA = (GC\ writes + ingest\ writes)/GC\ writes \qquad \text{EQUATION 2}$$

where:

GC writes can denote the amount of data moved in connection with performing GC processing; and ingest writes can denote the amount of data flushed from the log or written out to BE non-volatile storage in connection with flushing recorded writes of the log.

In at least one embodiment, the foregoing GC writes and ingest writes can be measured within the same time period.

In at least one embodiment with respect to determining WA for a particular storage class, GC writes of EQUATION 2 can be the metric e) discussed elsewhere herein, and ingest writes of EQUATION 2 can be the metric d) discussed elsewhere herein.

In at least one embodiment, the write density of a class "x", WDx, can be defined as in EQUATION 3 below:

$$WDx = (ingest\ writes + GC\ writes)/expanded\ or\ allocated\ capacity \qquad \text{EQUATION 3}$$

where:

ingest writes can denote the amount of data of the particular class x flushed from the log or written out to BE non-volatile storage in connection with flushing recorded writes of the log (e.g., metric d));

GC writes can denote the amount of data moved in connection with performing GC processing for the particular class (e.g., metric e); and expanded or allocated capacity denotes the allocated capacity for the particular class x (e.g., metric a).

For example, assume that class C has allocated or expanded capacity of 20 TB. During a time period such as 5 minutes, ingest writes can be 5 TBs where 5 TBs of class C data can be written and stored in the class storage, and GC can be 5 TBs where 5 TBs of class C data can be moved or written to class C storage in connection GC processing performed for class C storage. As such WDc for class C can be determined by EQUATION 3 as 10 TBs/20 TBs=$\frac{1}{2}$.

In at least one embodiment, the write density factor (WDF) for a class, x, denoted WDFx, can be defined as in EQUATION 4:

$$WDFx = WDx/sum\ of\ WDx\ for\ all\ classes \qquad \text{EQUATION 4}$$

where:

WDFx denotes the write density factor for a particular class, x;

WDx denotes the write density for class x (e.g., such as in EQUATION 3); and

"sum of WDx for all classes" denotes the sum of WDx values for all classes. The foregoing sum can be determined by calculating WDx for each of the classes and then summing or adding such values together. For example with 3 classes A-C, the "sum of WDx for all classes" can be determined by calculating $WD_A$ using EQUATION 3 for class A, calculating $WD_B$ using EQUATION 3 for class B, calculating $WD_C$ using EQUATION 3 for class C, and then calculating $WD_A + WD_B + WD_C$ as the "sum of WDx for all classes".

In at least one embodiment, the write amplification for the system, WAs, can be defined as in EQUATION 5 below:

$$WAs = sum\ of\ (WAx*WDFx)\ for\ all\ classes \qquad \text{EQUATION 5}$$

where:

WAx denotes the write amplification for class x;

WDFx denotes the write density factor for class x; and

"sum of (WAx*WDFx) for all classes" denotes the sum of the products (WAx*WDFx) for all classes. The foregoing sum can be determined by calculating WAx and WDFx for each of the classes, multiplying WAx*WDFx for each of the classes to determine a multiplicative product for each of the classes, and the adding or summing all such multiplicative products. For example with 3 classes A-C, the "sum of (WAX*WDFx) for all classes" can be expanded as:

$$=(WA_A*WDF_A) + (WA_B*WDF_B) + (WA_C*WDF_C)$$

In at least one embodiment, WAx can be determined for class x using EQUATION 2, and WDFx can be determined for class x using EQUATION 3.

In at least one embodiment, the sum of the WDFx values across all classes can be equal to 1, where each such WDFx value for each class x can be determined using EQUATION 4.

In at least one embodiment, the GC cost of the system can be reduced by reducing the utilization of classes with high write density, as the lower the utilization of such a class, the lower the amount of data moved due to GC processing of the class, thereby reducing the class WA and system level WA. The utilization of a class can be reduced by increasing the amount of capacity allocated to the class (e.g., over provisioning). In at least one embodiment, the utilization of a class can be reduced by increasing a class's expanded capacity by further allocating additional storage capacity to the class. In at least one embodiment, the additional storage capacity can include currently unallocated storage capacity not yet allocated to any class. In at least one embodiment, the additional storage capacity can be obtained through rebalancing or redistributing unused allocated capacity from other classes which have low write density. In at least one embodiment, such rebalancing can redistribute or reallocate storage from a source class to a target class where the source class has a low write density and the target class has a high write density even when the source class has a high utilization. Generally, classes which have low write density can have packed PLBs (e.g., with valid data and a high utilization) due to prior GC and a less need for further GC. Moreover, even if the WA of a first class with a low write density class increases, the contribution of the first class's WA to the overall system WA can be less than a second class's WA, where the second class has a high write density.

In at least one embodiment, the techniques of the present disclosure can provide for optimizing the overall system WA, WAs, such as expressed in EQUATION 5, by adjusting the WA of one or more individual classes, and more specifically by trying to reduce the WA of one or more classes with high WD (e.g. WDx for class x such as expressed using EQUATION 3).

In at least one embodiment, for one or more classes with the highest class level WD (e.g., WDx), each such high level WD class can consume more capacity storing write data. Accordingly in at least one embodiment, the techniques of the present disclosure can provide a class x (which has one of the highest class level WDx) additional capacity in order to reduce the class's corresponding utilization and GC processing costs. If the class level utilization decreases, it means that the class includes lower per PLB utilizations thereby reducing GC processing costs, such as the amount of data moved or copied during GC processing, associated with generating a free PLB from partially filled or utilized PLBs. By reducing the GC processing costs such as reducing the amount of data moved to generate a free PLB, WA can also be reduced for the class, and thus for the system.

In at least one embodiment, the techniques of the present disclosure can provide for rebalancing or redistributing unused allocated capacity, or more generally any storage capacity, among the classes based, at least in part, on the write amplification and the write density of each of the classes. In at least one embodiment, each class or type "x" of storage can be assigned a priority based, at least in part, on the WAx and WDx of the class x.

Figure 15:
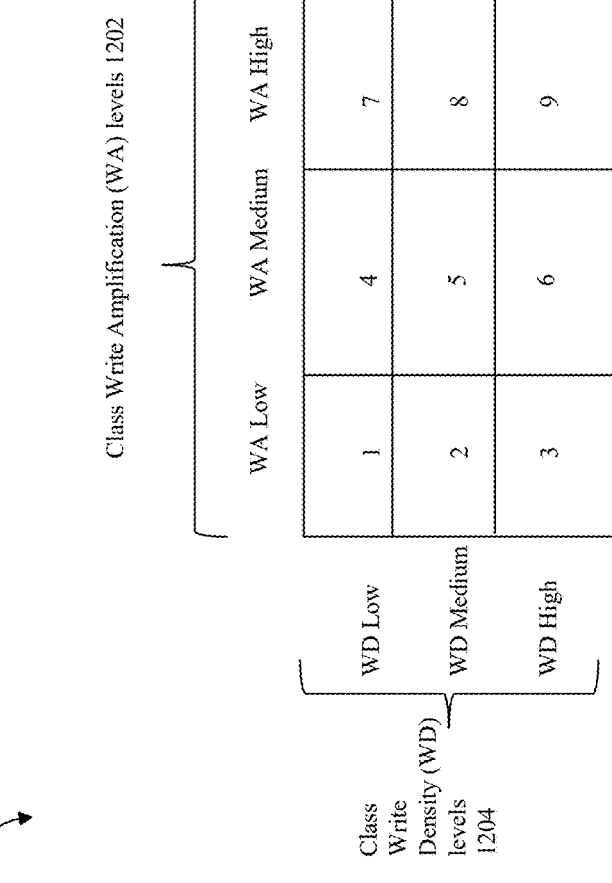
FIGS. 15 and 16 are examples in connection with determining priorities of storage classes in at least one embodiment in accordance with the techniques of the present disclosure.

With reference to the example 1200 of FIG. 15, shown is a table of priorities based, at least in part, on the WAx and WDx of a class x, that can be used in at least one embodiment in accordance with the techniques of the present disclosure.

The table 1200 includes i) column headers 1202*a-c* denoting class WA levels of WA low 1202*a*, WA medium 1202*b*, and WA high 1202*c*, and row headers 1202*a-c* denoting class WD levels of low WD 1204*a*, WD medium 1204*b*, and WD high 1204*c*.

Figure 16:
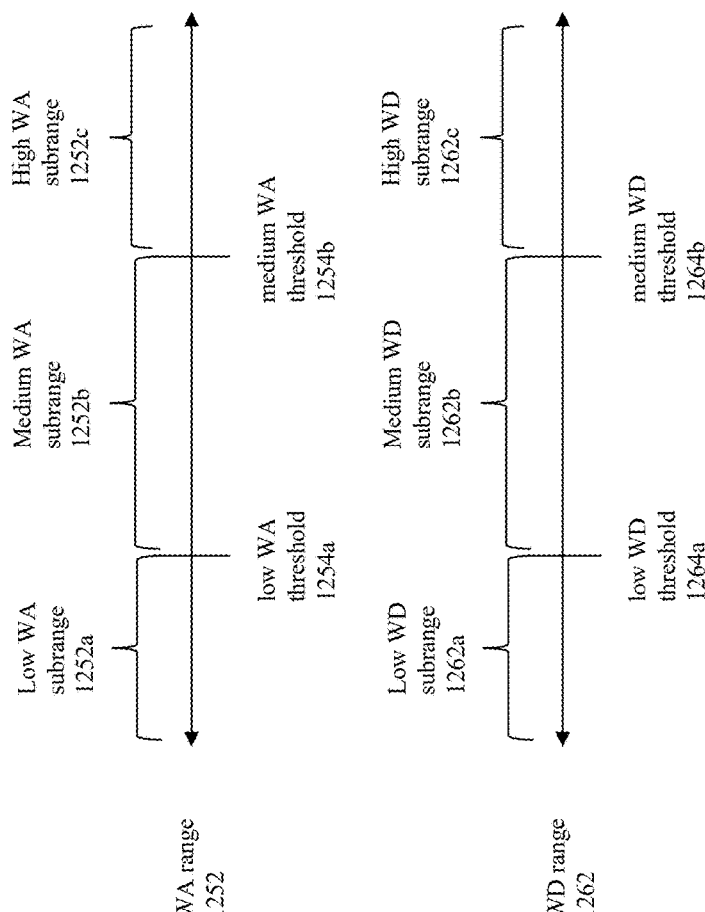

In at least one embodiment, possible or potential class level WA values, such as determined using WAx based on EQUATION 2, can form a WA range that can be partitioned into 3 contiguous subranges each denoting one of the WA class levels of WA low 1202*a*, WA medium 1202*b* and WA high 1202*c*. The WA range can denote the range of possible values that can be determined or calculated for a class. For example with reference to the example 1250 of FIG. 16, the WA range 1252 can denote a contiguous range of WA values. A low WA subrange 1252*a* can be defined including all values at or below a low WA threshold 1254*a*, a medium WA subrange 1252*b* can be defined that includes all values that are greater than the low WA threshold 1254*a* and equal to or less than a medium WA threshold 1254*b*, and a high WA subrange 1252*c* including all values greater than the medium WA threshold 1254*b*. A calculated WAx value for a class x falling in i) the low WA subrange 1252*a* can be classified as the WA low level 1202*a*, ii) the medium WA subrange 1252*b* can be classified as the WA medium level 1202*b*, and iii) the high WA subrange 1252*c* can be classified as the WA high level 1202*c*.

In at least one embodiment, possible or potential class level WD values, such as determined using WDx based on EQUATION 3, can form a WD range that can be partitioned into 3 contiguous subranges each denoting one of the WD class levels of WD low 1204*a*, WD medium 1204*b* and WD high 1204*c*. The WD range can denote the range of possible values that can be determined or calculated for a class. For example with reference to the example 1250 of FIG. 16, the WD range 1262 can denote a contiguous range of WD values. A low WD subrange 1262*a* can be defined including all values at or below a low WD threshold 1264*a*, a medium WD subrange 1262*b* can be defined that includes all values that are greater than the low WD threshold 1264*a* and equal to or less than a medium WD threshold 1264*b*, and a high WD subrange 1262*c* including all values greater than the medium WD threshold 1264*b*. A calculated WD x value for a class x falling in i) the low WD subrange 1262*a* can be classified as the WD low level 1204*a*, ii) the medium WD subrange 1262*b* can be classified as the WD medium level 1204*b*, and iii) the high WD subrange 1262*c* can be classified as the WD high level 1204.

For a class x, i) its WDx value (e.g., EQUATION 3) can be used to determine a corresponding WDx level based on which of the subranges 1252*a-c* includes the WDx value, and ii) its WAx value can be used to determine a corresponding WAx level (e.g., EQUATION 2) based on which of the subranges 1254*a-c* includes the WAx value. For the class x having a corresponding pair of values (WDx level, WAx level), the WDx level can be used to identify a row Rx in the table 1200 and the WAx level can be used to identify a column Cx in the table 1200, thereby identifying a particular cell or entry E1 located at (Rx, Cx). The entry E1 can denote the priority assigned to the class x based on its corresponding class values WDx and WAx.

In at least one embodiment, the redistribution of storage between classes can be determined factoring in each class's current WA and WD. As described above, for each class x, a priority can be assigned to each [WDx, WAx] pair based on the particular class x's contribution to the overall system WA. In at least one embodiment, the table 1200 generally denotes a ranking from 1-9, inclusively, where each of 1-9 denotes one of the 9 priorities in one of the 9 entries or cells of the table 1200. Generally, the higher the priority assigned to a class x in the foregoing ranking from 1-9, the greater the class x contributes to the overall system WAs (e.g., EQUATION 5).

In at least one embodiment, storage can be redistributed from a lower priority class to a higher priority class where the higher priority class has a higher priority than the priority of the lower priority class. In the example 1200, priority 1 denotes the lowest priority class up to the highest priority class with priority 9, where priority 1 corresponds to the entry (WD low, WA low), and priority 9 corresponds to (WD high, WA high). For example, but not limited to, assume a system has three class A, B, and C. Assume further that: class A has a corresponding value pair of [WD low, WA low], class B has a corresponding value pair of [WD low, WA medium], and class C has a corresponding value pair of [WD high, WA high]. In at least one embodiment, capacity can be redistributed generally from a class with a lower priority to a class with a higher priority. In particular in at least one embodiment, capacity (that is allocated to a source class but that is free or not consumed) can be redistributed from the source class, such as class A, having priority 1 (e.g.,

[WD low, WA low]) to a target class, such as class C, having priority 9 (e.g., [WD high WA high]). If the one or more priority 1 classes do not have enough free unused capacity to release and meet the specified storage needs or requirements of the target class C, then capacity can be redistributed as needed from one or more other classes based on the priority of such classes in the ranking. Generally in at least one embodiment, when a target class, such as class C, needs a specified amount of storage or generally has a storage goal or target amount, storage can be allocated or assigned to class C from a general pool of unallocated system storage, if any. If there is none or an insufficient amount of unallocated system storage, then processing can be performed to redistribute or reallocate storage from one or more lower priority classes (having priority levels lower than the target class) to meet the storage target or need of the target class C. In this example, processing can generally seek to reallocate allocated free capacity from other classes, such as A and B, to class C based on the priorities of such other classes. In particular, allocated free storage capacity can be reallocated from the other classes based on the ranking, from low priority to high priority, of such other classes so that processing seeks to fulfill or meet the storage demand or goal of the target class by reallocating storage from the remaining classes based in increasing priority level. In this example where the classes A, B and C have corresponding priorities of 1, 4, 9, and the target class is C, processing can first determine whether there is any unallocated system storage or an insufficient amount of unallocated system storage to meet the storage goal or demand of class C. If class C's storage goal or demand is not met with any unallocated system storage, then processing can be performed to reallocate or redistribute storage from the remaining other classes B and C. In this example, class A has priority 1 that is lower than priority 4 of class B. As a result, processing can be performed to reallocate allocated free capacity from one or more other classes to class C to meet C's storage demand or goal based on the increasing priority of remaining classes A and B. In this example, processing can determine whether class A has an amount of free capacity which can be reallocated to class C and which can meet the storage goal or target of class C. For example, if class C needs 16 TB of storage, class A may have only 8 TB of free storage capacity whereby the 8 TB of storage is reallocated from class A to class C. Class A may now have a class level utilization of 100%. In this case, class C still needs another 8 TB of storage so processing continues to seek free capacity from class B, the next ranked class based on increasing priorities. Assume that class B has more than 8 TBs of free capacity. In this case, 8 TB of storage capacity can be reallocated from class B to class C.

Generally in at least one embodiment when reallocating or redistributing storage from a source class to a target class, any free capacity of the source class can be reallocated to the target class so that the source class can have up to a 100% class level utilization after such reallocation to the target class. As a variation to the foregoing, an embodiment can specify a maximum class level utilization (e.g., Metric b) whereby the source class may only be allowed to reallocate an amount of free capacity, if any, to the target class whereby after the reallocation, the source class is not allowed to have a class level utilization (e.g., Metric b) that exceeds the maximum class utilization.

In at least one embodiment such as described above and elsewhere herein, storage capacity can be redistributed or reallocated from i) unallocated system storage capacity and/or ii) one or more source classes to a target class in response to an occurrence of one or more conditions. For example, such redistribution can be performed in response to a need or demand by the target class to store more data. For example, such redistribution can be performed in response to any of i) the target class falling below a specified minimum level of allocated free storage capacity, such as in connection with flush processing or generally any processing that makes such a determination with respect to the target class. In at least one embodiment, if additional capacity is needed by the target class to store data, and there is insufficient free capacity in all other classes having a lower priority than the target class, then processing can seek to reassign or reallocate free capacity from a source class with a higher priority than the target class, but where the source class priority can have a minimum distance of all other classes having a higher priority than the target class. Generally, processing can seek to reallocate free capacity from candidate source classes having a higher priority than the target class where free capacity is obtained from such candidates, as needed, based on increasing priority level. For example, assume that the target class B with priority 4 needs additional storage capacity because class B free storage is at or near zero, or generally below a minimum level, such as determined in connection with flushing class B data. Assume also that i) there is no unallocated free system capacity, ii) class A with priority 1 has no free capacity, and iii) class D with priority 5 has free capacity and class E with priority 7 has free capacity. In this case, processing can be performed to reallocate storage from class D, the class with a priority higher than class B but where class D has the minimum or lowest priority that is also greater than class B's priority of 4. If class D has sufficient free capacity as needed by Class B, then class D's free capacity is reallocated to Class B. If class D does not have sufficient free capacity as needed by Class B, then processing can also proceed to reallocate storage from class E.

Figure 17:
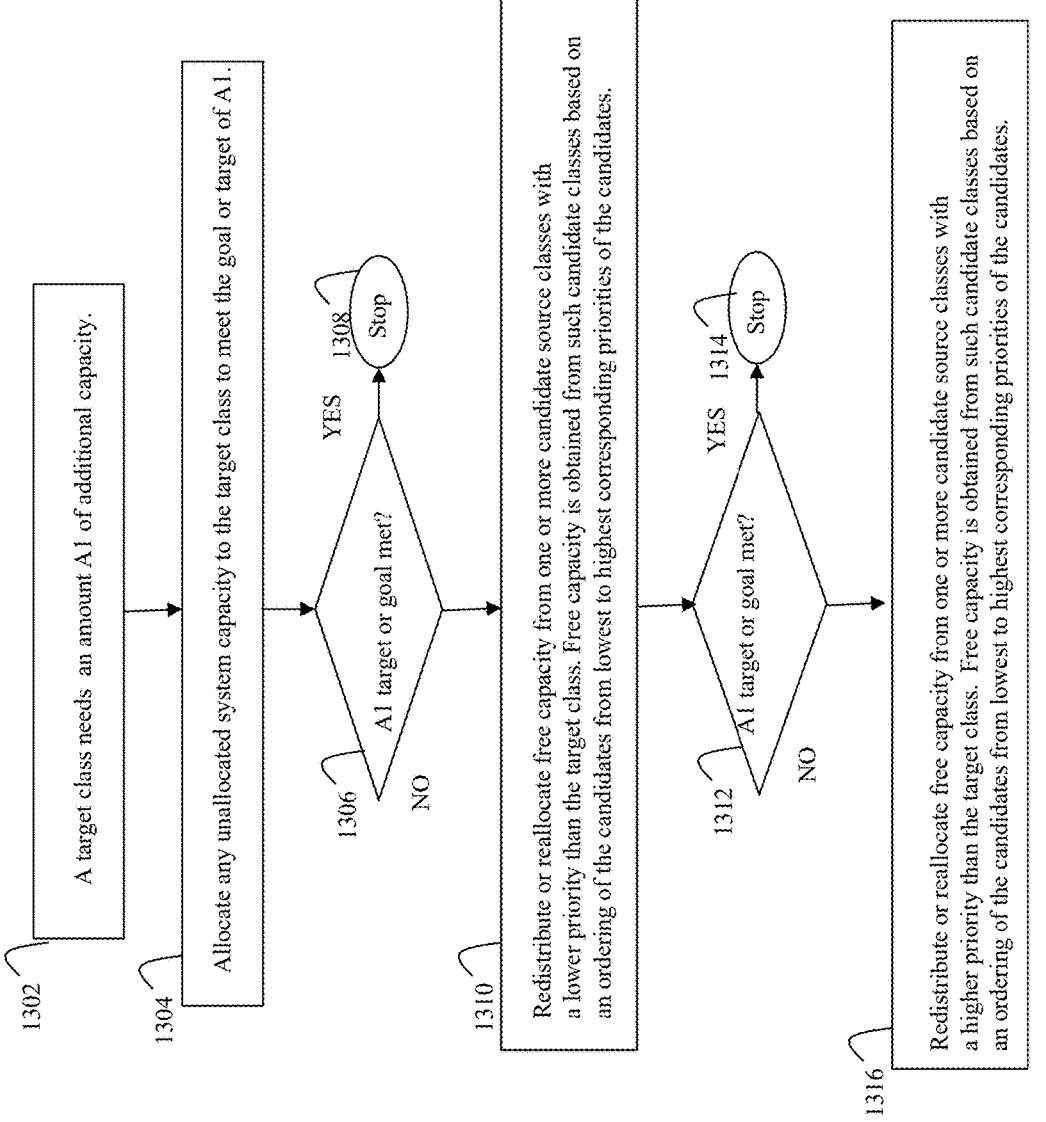

Referring to FIG. 17, shown is a flowchart 1300 of processing steps that can be performed in at least one embodiment in accordance with the techniques of the present disclosure. The FIG. 17 summarizes processing discussed above.

At the step 1302, processing can determine that a target class needs an amount A1 of additional capacity. Consistent with discussion herein, the additional capacity A1 can be determined for any suitable need, demand or requirement some of which are discussed herein. From the step 1302, control proceeds to the step 1304.

At the step 1304, processing can allocate any unallocated system capacity to the target class to meet the goal or target of A1. From the step 1304, control proceeds to the step 1306.

At the step 1306, processing can determine whether sufficient free capacity has been allocated to meet the goal or target of A1. If the step 1306 evaluates to yes, control proceeds to the step 1308 where processing in connection with allocating or assigning additional storage capacity to the target class can stop. If the step 1306 evaluates to no, control proceeds to the step 1310.

At the step 1310, processing can be performed to redistribute or reallocate free capacity from one or more candidate source classes with a lower priority than the target class. Free capacity can be obtained from such candidate classes based on an ordering of the candidates from lowest to highest corresponding priorities of the candidates. From the step 1310, control proceeds to the step 1312.

At the step 1312, processing can determine whether sufficient free capacity has been allocated to meet the goal or target of A1. If the step 1312 evaluates to yes, control proceeds to the step 1314 where processing in connection with allocating or assigning additional storage capacity to the target class can stop. If the step 1312 evaluates to no, control proceeds to the step 1316.

At the step 1316, processing can redistribute or reallocate free capacity from one or more candidate source classes with a higher priority than the target class. Free capacity is obtained from such candidate classes based on an ordering of the candidates from lowest to highest corresponding priorities of the candidates.

It should be noted that in at least one embodiment for one or more particular conditions or scenarios, processing to obtain free capacity for the target class may stop at step 1310 and choose not to look to higher priority classes than the target class to obtain free capacity. In at least one embodiment, processing may proceed to step 1312 only for certain necessary conditions or scenarios such as, for example, where the target class is out of free capacity or has an amount of free capacity below a minimum level.

In general, processing of FIG. 17 can cease to allocate or assign free capacity to the target class once the cumulative amount of free capacity which is allocated or assigned to the target class in connection with FIG. 17 processing equals A1 to thereby meet the target or goal A1. In at least one embodiment, if processing of the FIG. 17 fails to allocate or assign an amount of free capacity equal to A1 to the target class, an alert, error or message can be provided, for example, to a system administrator or other user regarding the foregoing so that a corrective action can be taken. As a variation in at least one embodiment, one or more corrective actions can be automatically taken. For example, one corrective action can be to further provision or add additional BE non-volatile storage into the unallocated storage capacity pool.

In at least one embodiment, the WA of the system (e.g., WAs as in EQUATION 5) can be periodically evaluated and, based on its current value or an observed trend such as increasing WAs over a period of time, processing can be performed to add additional capacity to one or more classes each having a corresponding priority that is one or more of the highest priorities. For example, in at least one embodiment, a policy can specify to add additional capacity to one or more classes each having a corresponding priority of 9 or 8 if the current WAs is more than a specified threshold or if the WAs has been above a specified threshold for more than a specified period of time based on periodic observations of WAs values. In at least one embodiment, the policy can further indicate to add additional capacity to a candidate class with a priority of 8 or 9 if the candidate class has a corresponding threshold exceeding a specified maximum. In at least one embodiment, the amount of additional capacity added to a target class, such as one with a priority of 9, can be based on an overprovisioning factor associated with the target class. In at least one embodiment, the overprovisioning factor can be, for example, a percentage used to determine an additional amount of free capacity to be added to the target class. For example, the overprovisioning factor percentage P1% can indicate to increase the amount of free capacity by P1% of the currently allocated capacity of the target class. In at least one embodiment, the overprovisioning factor can be, for example, an integer value denoting the additional amount of free capacity to be added to the target class. More generally, any suitable technique can be used to determine the amount of additional capacity to be added to the target class in efforts to reduce WA of the target class and thus reduce WAs.

Generally, the overprovisioning factor for a class can be determined using any suitable means or technique. In at least one embodiment, the overprovisioning factor, OF, for a class x can be determined as expressed in EQUATION 6 below:

$$OFx = ((\text{Priority}(x)-1)/\text{NUM})*(((\text{system free capacity } \%)/(\text{utilization } x))/2) \qquad \text{EQUATION 6}$$

where:

Priority (x) denotes the priority of the class x as determined using the table of FIG. 15;

NUM denotes the number of priority levels, such as 9 in connection with FIG. 15;

system free capacity denotes the total amount of free capacity (both allocated and unallocated) in the system; and utilization x denotes the class level utilization (e.g., metric b) of the class x.

To further illustrate use of an overprovisioning factor that can be specified for a class of a high priority such as priority 9, reference is made to the example 1400 of FIG. 18.

The example 1400 includes a table of various values denoting the current state of the system at a point in time in connection with three classes A, B and C. The table of 1400 includes column headers 1402 denoting the corresponding classes: A 1402*a*, B 1402*b* and C 1402*c*. The table 1400 includes the following rows of information for each of the foregoing classes: Priority 1404, Allocated storage (in TBs) 1406, Utilization 1408, Overprovisioning factor 1410, and Target allocated storage (in TBs) 1412. The priority 1404 for each class can be determined, for example, as discussed above in connection with FIG. 15. For each of the classes A-C having a corresponding column 1402*a-c* in the table of 1400, the corresponding column denotes various values of the class. In the example 1400, assume that the total amount of capacity in the system is 100 TBs so that all 100 TBs of the system are allocated whereby there is no remaining unallocated capacity. Also assume that the total amount of free capacity in the system is 25% or 25 TBs.

As denoted by 1402*a*, class A has: a priority of 9 (1404), 35 TBs of storage currently allocated to class A (1406), a class level utilization of 70% (1408), an overprovisioning factor as a percentage of 15% (1410) and a target allocated storage of 40.25 TBs (1412) The overprovisioning factor of 15% for class A can be determined, for example, using EQUATION 6 above. The target allocated storage of 40.25 TBs can be determined by multiplying the overprovisioning factor of 15% by the amount of storage capacity (1406) currently allocated to class A.

As denoted by 1402*b*, class B has: a priority of 5 (1404), 3 TBs of storage currently allocated to class B (1406), a class level utilization of 75% (1408), an overprovisioning factor of 0 (1410), and no target allocated storage (1412) In this example, there may be no overprovisioning factor for class B because class B does not have a high enough priority. For example, an embodiment can specify a set of one or more of the highest priorities for which an overprovisioning factor can be used. In this example, an overprovisioning factor can be used in connection with classes having a priority level of 9.

As denoted by 1402*c*, class C has: a priority of 2 (1404), 30 TBs of storage currently allocated to class C (1406), a class level utilization of 80% (1408), an overprovisioning factor of 0 (1410), and no target allocated storage (1412) In this example, there may be no overprovisioning factor for class C because class C does not have a high enough priority. For example, an embodiment can specify a set of one or more of the highest priorities for which an overprovisioning factor can be used. In this example, an overprovisioning factor can be used in connection with classes having a priority level of 9.

In at least one embodiment, processing can be performed to periodically evaluate WAs as noted above. In response to any of: i) WAs exceeding a specified maximum, ii) an observed trend of WAs increasing over a period of time, and/or iii) WAs exceeding a specified maximum for a number of times within a specified time period, processing can be performed to reduce WAs such as by seeking to reduce the WA of one or more classes each having a high priority that is included in a set of one or more defined high priorities. For example, the set can include only priority 9, or alternatively can include priorities 8 and 9. More generally, the set can include one or more of the highest priorities that can be assigned to a class. More generally, in response to determining that WAs meets one or more trigger conditions, such as those noted above indicating that WAS needs to be reduced, processing can be performed to reduce WAs by seeking to reduce the WA of one or more classes each having a high priority that is included in a set of one or more defined high priorities.

In the example 1400, processing can include further evaluating the utilization of class A having the highest priority level of 9. As denoted by row 1408 of column 1402a for class A, class A has a class level utilization of 70%, where 70% can exceed a specified maximum. In response to class A having an associated priority level of 9 and a class level utilization of 70% exceeding a specified maximum, processing can be performed to reduce the utilization of class A, to thereby reduce the WA of class A, which thereby further reduces the WAs (WA of the system). As a result of the foregoing, processing can be performed to increase the amount of storage allocated to class A. In at least one embodiment, the overprovisioning factor of 15% can be used to determine the target allocated storage (in TBs 1412) of 40.25 TBs for class A. The target 1412 of 40.25 TBs can be determined by multiple the overprovisioning factor of 15% by the current capacity allocated to class A, 35 TBs (1406). In at least one embodiment, the amount A1 as the goal or target by which to increase class A's allocated storage can be determined by the difference between class A's target, 40.25 TBs, and its current allocated capacity, 35 TBs, where the difference is 5.25 TBs.

In connection with the example 1400, all the system storage capacity is allocated with an overall free capacity in the system of 25%. In this case, the target class is A where free capacity from candidate source classes B and/or C needs to be redistributed to A. In this example and consistent with other discussion above, since class C has the lowest priority, the free capacity from source class C can be reallocated to the target class A, until either i) class C reaches a maximum utilization, or ii) at least the target amount of 5.25 TBs has been reallocated to class A such that class A reaches its target allocated capacity of 40.25 TBs (1412). If the target class A has not reached its target allocated capacity, then the next lower ranked priority class, class B, can have its free capacity reallocated to the target class C until either i) class B reaches a maximum utilization, or ii) at least the target amount of 5.25 TBs has been reallocated to class A such that class A reaches its target allocated capacity of 40.25 TBs (1412).

It should be noted that storage capacity can be reallocated or redistributed in any suitable size chunks of segments such as based on a size granularity of an SU, an uber, or any other suitable size.

It should be noted that if the system had unallocated free capacity, then the unallocated storage can be allocated to the target class A before proceeding with obtaining or reallocating free capacity from other classes B and/or C as discussed above.

Figure 19:
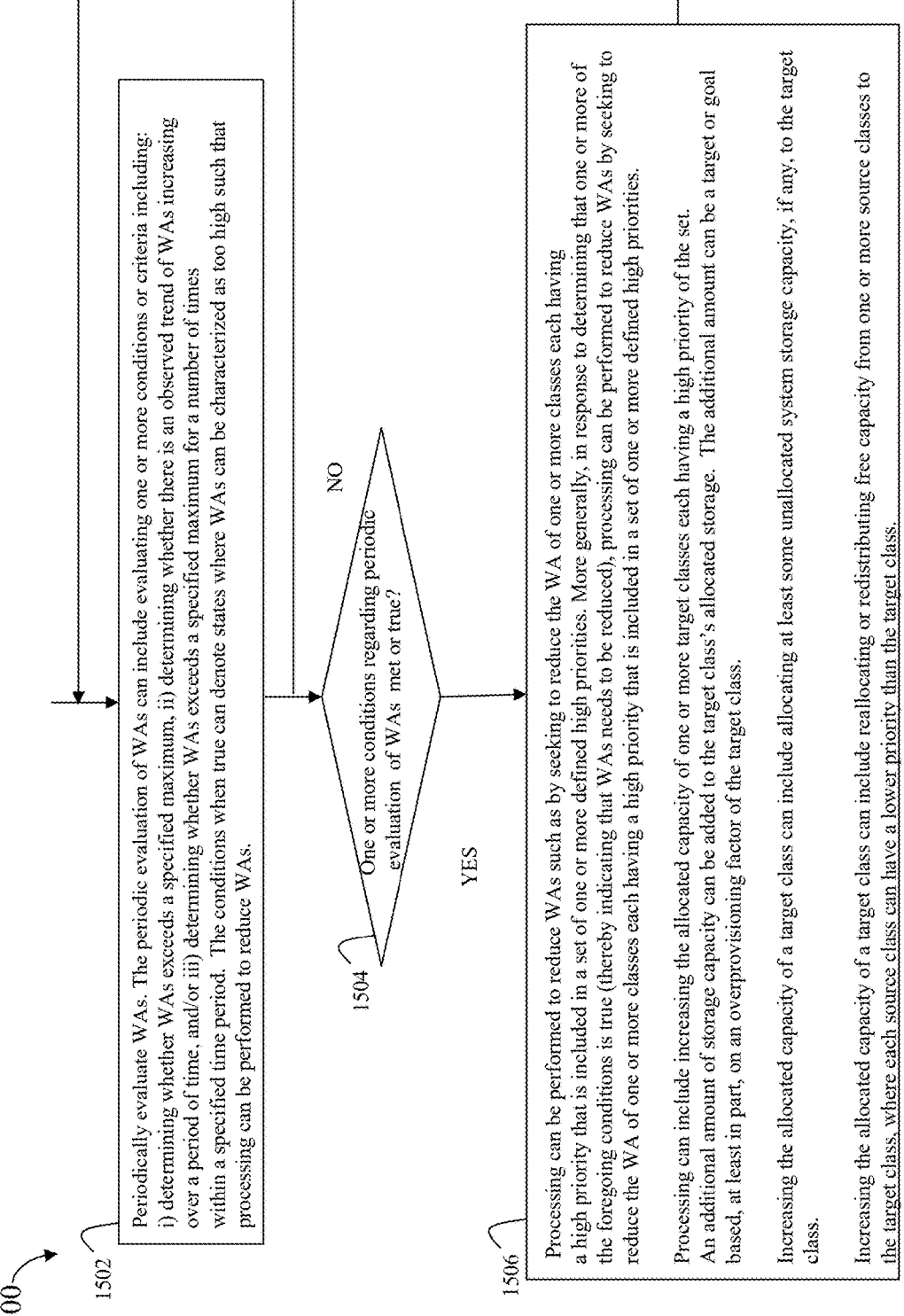

Referring to FIG. 19, shown is a flowchart 1500 of processing steps that can be performed in at least one embodiment in accordance with the techniques of the present disclosure. The flowchart 1500 summarizes processing discussed above.

At the step 1502, processing can be performed to periodically evaluate WAs of the system. The periodic evaluation of WAs can include evaluating one or more conditions or criteria including: i) determining whether WAs exceeds a specified maximum, ii) determining whether there is an observed trend of WAs increasing over a period of time, and/or iii) determining whether WAs exceeds a specified maximum for a number of times within a specified time period. Any of the conditions when true can denote a state of the system where WAs can be characterized as too high such that processing can be performed to reduce WAs. From the step 1502 control proceeds to the step 1504.

At the step 1504, a determination can be made as to whether one or more conditions (of the step 1502) regarding periodic evaluation of WAs are met or true. If the step 1504 evaluates to no or false whereby none of the conditions of the step 1502 are true, control returns to the step 1502. If the step 1504 evaluates to yes or true whereby at least one of the conditions of the step 1502 are true regarding WAs, control proceeds to the step 1506.

At the step 1506, processing can be performed to reduce WAs such as by seeking to reduce the WA of one or more classes each having a high priority that is included in a set of one or more defined high priorities. More generally, in response to determining that one or more of the foregoing conditions of step 1502 is true (thereby indicating that WAs needs to be reduced), processing can be performed to reduce WAs by seeking to reduce the WA of one or more classes each having a high priority that is included in a set of one or more defined high priorities.

Processing of the step 1506 can include increasing the allocated capacity of one or more target classes each having a high priority of the set. An additional amount of storage capacity can be added to a target class's allocated storage. The additional amount can be a target or goal based, at least in part, on an overprovisioning factor of the target class. Increasing the allocated capacity of a target class can include allocating at least some unallocated system storage capacity, if any, to the target class. Increasing the allocated capacity of a target class can include reallocating or redistributing free capacity from one or more source classes to the target class, where each source class can have a lower priority than the target class. From the step 1506, control can return to the step 1502.

In at least one embodiment, redistributing or reallocating free storage from a source class to a target class can include performing GC processing as described herein on the source class to generate one or more segments, such as SUs or ubers, of contiguous free storage that are reallocated to the target class. In at least one embodiment, such GC processing can include any of the techniques and processing described herein such as, for example, in connection with FIGS. 12 and 14.

The techniques of the present disclosure can be used in at least one embodiment to reduce overall GC costs in a storage system which handles different types of applications with different I/O profiles by segregating and modulating the GC cost of each such application's data. More specifically in at least one embodiment, the techniques of the present disclosure provide for: i) separating different types or classes of application data each having a corresponding I/O profile into separate sub-LSSs or classes of storage, where each storage class or sub-LSS can be used for storing a single type or class of data; ii) redistributing or reallocating storage among classes; iii) measuring various metrics and determining a priority of each class of storage; and iv) modulating GC cost of each class by controlling the amount of overprovisioning and accordingly increasing the storage capacity of one or more high priority classes, such as classes with high WD and high WA, in efforts to reduce overall GC costs and WAs of the system.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:

receiving, at a storage system, a plurality of write operations from a plurality of applications executing on one or more hosts;

recording, at the storage system, the plurality of write operations in a plurality of entries in a log; and flushing, from the log, the plurality of entries denoting the plurality of write operations, wherein said flushing includes:

segregating first content written by the plurality of write operations from the plurality of applications into a plurality of streams, wherein each of the plurality of streams corresponds to one of a plurality of classes or types of data associated with one of a plurality of I/O profiles characterizing said each stream and said one class or type of data; and for each of the plurality of streams corresponding to said one class or type of data associated with said one I/O profile, persistently storing a corresponding portion of the first content in one of a plurality of sub log structured systems (LSSs) used for only storing data of said one class or type that corresponds to said each stream;

wherein the plurality of sub LSSs correspond to classes or types of storage, wherein each of the classes or types of storage corresponds to one of the plurality of classes or types of data, and wherein the method includes:

determining that a first of the classes or types of storage needs first additional storage capacity in connection with storing data of a first of the plurality of classes or types of data; and in response to determining that the first class or type of storage needs the first additional storage capacity, performing first processing to increase a first allocated storage capacity of the first class or type of storage.

2. The computer-implemented method of claim 1, wherein the plurality of sub LSSs each include back-end (BE) non-volatile storage of the storage system.

3. The computer-implemented method of claim 1, wherein, for each of the sub LSSs, each time updated content written to a logical address is stored in said each sub LSS whereby the updated content replaces existing content stored at the logical address, the updated content is written to a new physical location that is different from a current physical location of the existing content.

4. The computer-implemented method of claim 1, wherein each of the plurality of I/O profiles, which corresponds to a first of the plurality of classes or types of data and a first of the plurality of streams, includes one or more characteristics of said first class or type of data, wherein the one or more characteristics include any of: one or more I/O workload characteristics of the first class or type of data; a data deduplication ratio for the first class or type of data; a data compression ratio for the first class or type of data, and a tag identifying one or more of the plurality of applications that write data of the first class or type of data.

5. The computer-implemented method of claim 4, wherein the one or more I/O workload characteristics includes any of: an indication or whether a first I/O workload of the first class or type of data is write heavy whereby the first I/O workload has more write operations than read operations, an indication of whether writes of the first I/O workload exhibit spatial locality, and an indication of whether writes of the first I/O workload exhibit temporal locality.

6. The computer-implemented method of claim 4, wherein the plurality of applications writes to a plurality of storage entities each associated with one of the plurality of I/O profiles.

7. The computer-implemented method of claim 6, wherein the plurality of storage entities include any of: one or more volumes, and one or more file systems.

8. The computer-implemented method of claim 1, wherein the first class or type of storage is a target class, and wherein the first processing includes:

redistributing or reallocating first free storage capacity from a second of the classes or types of storage to the target class, wherein the second class or type of storage is a source class.

9. The computer-implemented method of claim 8, wherein said first processing includes:

performing first garbage collection (GC) processing on the source class to generate a first free storage segment reallocated from the source class to the target class.

10. The computer-implemented method of claim 9, wherein the first processing includes updating first information about the first free storage segment to indicate that the first free storage segment is included in the target class rather than the source class whereby the first free storage segment is used in connection with storing data of only a single class or type corresponding to the target class.

11. The computer-implemented method of claim 10, wherein the source class corresponds to a first sub LSS of the plurality of sub LSSs whereby the first GC processing is performed on storage of the first sub LSS to generate the first free storage segment of the first sub LSS, and wherein the first GC processing includes:

allocating a new storage segment associated with a new reclaim unit which is mapped to a first portion of BE non-volatile storage of the first sub LSS;

combining valid data from two storage segments of the first sub LSS to generate combined first data, wherein the two storage segments correspond to two reclaim units mapped to two portions of BE non-volatile storage of the first sub LSS;

storing the combined first data on the new claim unit;

deallocating a first segment of the two storage segments, wherein said deallocating includes unmapping the first segment corresponding to a first of the two reclaim units from a corresponding one of the two portions of BE non-volatile storage of the first sub LSS;

reallocating the first segment, wherein said reallocating includes mapping the first segment corresponding to the first reclaim unit to another corresponding portion of BE non-volatile storage of the first sub LSS; and assigning the first segment to the target class corresponding to a second sub LSS of the plurality of sub LSSs, wherein the first segment is the first free storage segment.

12. The computer-implemented method of claim 10, wherein the source class corresponds to a first sub LSS of the plurality of sub LSSs whereby the first GC processing is performed on storage of the first sub LSS to generate the first free storage segment of the first sub LSS, and wherein the first GC processing includes:

combining valid data from two storage segments of the first sub LSS to generate combined first data, wherein the two storage segments are included in BE non-volatile storage of the first sub LSS;

storing the combined first data in a first of the two storage segments; and reassigning a second of the two storage segments to the target class corresponding to a second sub LSS of the plurality of sub LSSs.

13. The computer-implemented method of claim 12, wherein the two storage segments are physical large blocks (PLBs) included in a first sub uber (SU) of BE non-volatile storage of the first sub LSS, wherein the first SU is the first free storage segment reallocated from the source class to the target class.

14. The computer-implemented method of claim 13, further comprising:

assigning the first SU to the target class corresponding to a second sub LSS of the plurality of sub LSSs, wherein the first SU is included in the second sub LSS after said assigning the first SU to the target class.

15. The computer-implemented method of claim 1, wherein the first class or type of storage corresponds to a first of the plurality of sub LSSs, wherein the first class or type of storage denotes a target class, wherein a second of the classes or types of storage corresponds to a second of the plurality of sub LSSs, wherein the second class denotes a source class, and wherein the method further comprises:

determining, based at least in part, on a first write amplification denoting write amplification of the plurality of sub LSSs, to allocate the first additional storage capacity to the target class; and selecting the source class from the classes or types of storage based, at least in part, on a first priority of the target class and a second priority of the source class.

16. The computer-implemented method of claim 15, further comprising:

determining the first priority of the target class based, at least in part, on a first write density of the target class and a first write amplification of the target class; and determining the second priority of the source class based, at least in part, on a second write density of the source class and a second write amplification of the source class, wherein the first priority of the target class indicates any one or more of: that the first write density of the target class is greater than the second write density of the source class, and that the first write amplification of the target class is greater than the second write amplification of the source class.

17. The computer-implemented method of claim 1, further comprising:

performing GC processing including:

for each of the plurality of sub LSSs, performing first GC processing on said each sub LSS using only storage of said each sub LSS, wherein said first GC processing includes generating a free segment or portion of storage of said each sub LSS.

18. A system comprising:

one or more processors; and one or more memories comprising code stored therein that, when executed, perform a method comprising:

receiving, at a storage system, a plurality of write operations from a plurality of applications executing on one or more hosts;

recording, at the storage system, the plurality of write operations in a plurality of entries in a log; and flushing, from the log, the plurality of entries denoting the plurality of write operations, wherein said flushing includes:

segregating first content written by the plurality of write operations from the plurality of applications into a plurality of streams, wherein each of the plurality of streams corresponds to one of a plurality of classes or types of data associated with one of a plurality of I/O profiles characterizing said each stream and said one class or type of data; and for each of the plurality of streams corresponding to said one class or type of data associated with said one I/O profile, persistently storing a corresponding portion of the first content in one of a plurality of sub log structured systems (LSSs) used for only storing data of said one class or type that corresponds to said each stream;

wherein the plurality of sub LSSs correspond to classes or types of storage, wherein each of the classes or types of storage corresponds to one of the plurality of classes or types of data, and wherein the method includes:

determining that a first of the classes or types of storage needs first additional storage capacity in connection with storing data of a first of the plurality of classes or types of data; and in response to determining that the first class or type of storage needs the first additional storage capacity, performing first processing to increase a first allocated storage capacity of the first class or type of storage.

19. One or more non-transitory computer readable media comprising code stored thereon that, when executed, performs a method comprising:

receiving, at a storage system, a plurality of write operations from a plurality of applications executing on one or more hosts;

recording, at the storage system, the plurality of write operations in a plurality of entries in a log; and flushing, from the log, the plurality of entries denoting the plurality of write operations, wherein said flushing includes:

segregating first content written by the plurality of write operations from the plurality of applications into a plurality of streams, wherein each of the plurality of streams corresponds to one of a plurality of classes or types of data associated with one of a plurality of I/O profiles characterizing said each stream and said one class or type of data; and for each of the plurality of streams corresponding to said one class or type of data associated with said one I/O profile, persistently storing a corresponding portion of the first content in one of a plurality of sub log structured systems (LSSs) used for only storing data of said one class or type that corresponds to said each stream;

wherein each of the plurality of I/O profiles, which corresponds to a first of the plurality of classes or types of data and a first of the plurality of streams, includes one or more characteristics of said first class or type of data, wherein the one or more characteristics include any of: one or more I/O workload characteristics of the first class or type of data; a data deduplication ratio for the first class or type of data; a data compression ratio for the first class or type of data, and a tag identifying one or more of the plurality of applications that write data of the first class or type of data; and wherein the one or more I/O workload characteristics includes any of: an indication or whether a first I/O workload of the first class or type of data is write heavy whereby the first I/O workload has more write operations than read operations, an indication of whether writes of the first I/O workload exhibit spatial locality, and an indication of whether writes of the first I/O workload exhibit temporal locality.

20. The one or more non-transitory computer readable media of claim 19, wherein the plurality of sub LSSs correspond to classes or types of storage, wherein each of the classes or types of storage corresponds to one of the plurality of classes or types of data, and wherein the method includes:

determining that a first of the classes or types of storage needs first additional storage capacity in connection with storing data of a first of the plurality of classes or types of data; and in response to determining that the first class or type of storage needs the first additional storage capacity, performing first processing to increase a first allocated storage capacity of the first class or type of storage.

\* \* \* \* \*